(12) United States Patent
Knighton et al.

(10) Patent No.: US 11,847,268 B2
(45) Date of Patent: Dec. 19, 2023

(54) REPROGRAMABLE MULTI-HOST, MULTI-CHARACTER SET KEYBOARD

(71) Applicant: Synerdyne Corporation, Santa Monica, CA (US)

(72) Inventors: Mark S. Knighton, Santa Monica, CA (US); Peter J. DeLaurentis, Burlingame, CA (US)

(73) Assignee: Synerdyne Corporation, Santa Monica, CA (US)

( * ) Notice: Subject to any disclaimer, the term of this patent is extended or adjusted under 35 U.S.C. 154(b) by 330 days.

(21) Appl. No.: 16/821,734

(22) Filed: Mar. 17, 2020

(65) Prior Publication Data

US 2021/0048896 A1 Feb. 18, 2021

Related U.S. Application Data

(63) Continuation of application No. 15/359,501, filed on Nov. 22, 2016, now abandoned.

(60) Provisional application No. 62/263,217, filed on Dec. 4, 2015.

(51) Int. Cl.
*G06F 3/023* (2006.01)
*G06F 3/0354* (2013.01)
*G06F 3/02* (2006.01)
*G06F 3/04883* (2022.01)

(52) U.S. Cl.
CPC .......... *G06F 3/0238* (2013.01); *G06F 3/0219* (2013.01); *G06F 3/0221* (2013.01); *G06F 3/0231* (2013.01); *G06F 3/0235* (2013.01); *G06F 3/0236* (2013.01); *G06F 3/03547* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 2011/0179372 A1* | 7/2011 | Moore | G06F 3/0237 715/810 |
| 2011/0214053 A1* | 9/2011 | Scott | G06F 40/232 715/764 |
| 2013/0201109 A1* | 8/2013 | Knighton | G06F 3/0221 345/169 |

* cited by examiner

*Primary Examiner* — Stephen T. Reed
(74) *Attorney, Agent, or Firm* — Thomas Coester Intellectual Property

(57) ABSTRACT

A system having a keyboard capable of supporting multiple hosts and changing character sets. A first host processor communicates with a display. A keyboard has a plurality of independently moveable physical keys with each letter of an entire alphabet accessible by a single strike actuation of one of the plurality of keys. The keyboard uses twelve or fewer keys provide single strike access to the entire alphabet. A map defining functions of the keys appears on the display responsive to a prompting action of a user's hand without requiring any finger to leave the keys that provide access to the alphabet. The map defines the spatial relationship of each function relative to a home position of a finger.

20 Claims, 23 Drawing Sheets

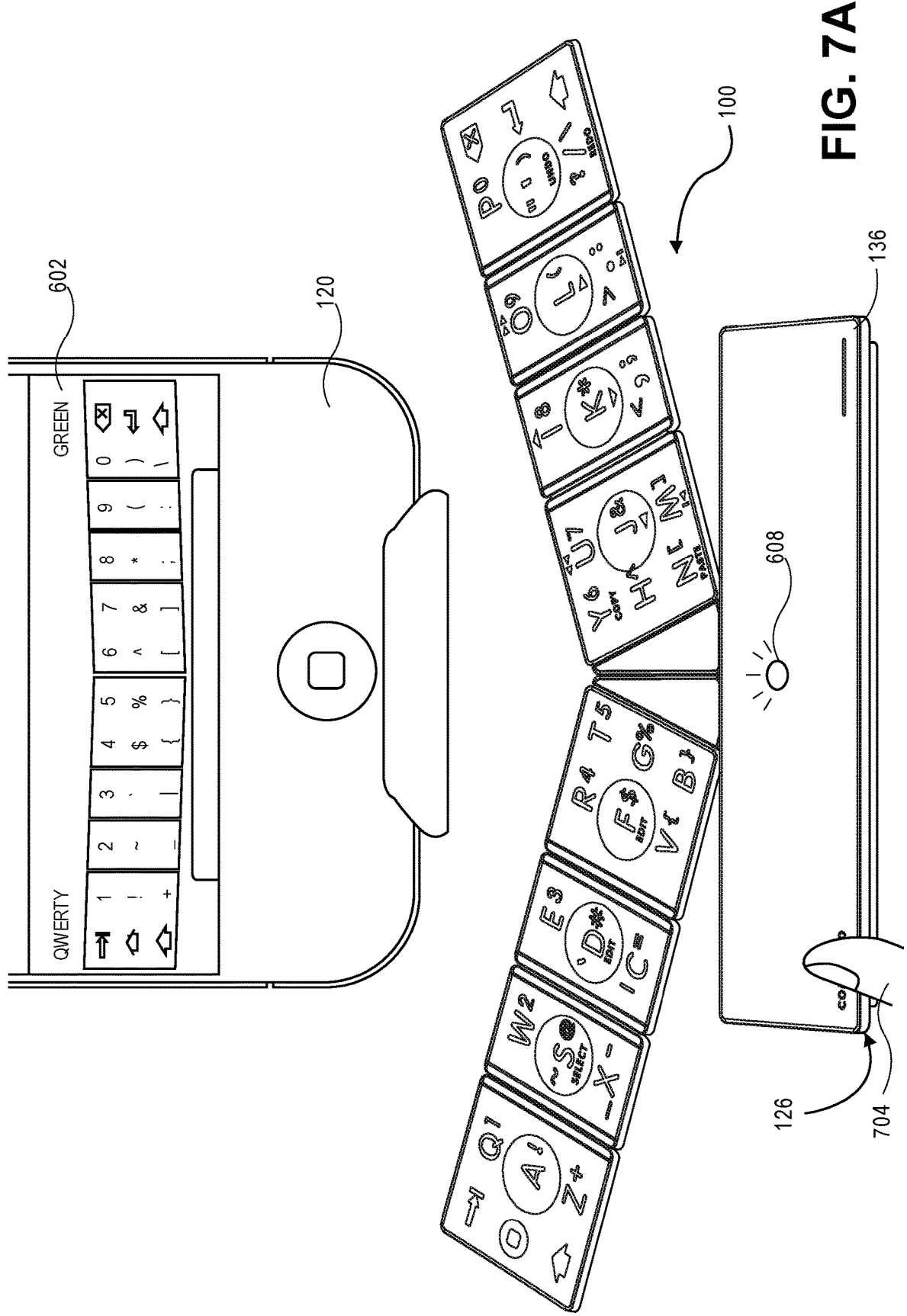

REPROGRAMABLE MULTI-HOST, MULTI-CHARACTER SET KEYBOARD

CROSSREFERENCE TO RELATED APPLICATIONS

This application is a continuation of U.S. application Ser. No. 15/359,501 entitled "REPROGRAMMABLE MULTI-HOST, MULTI-CHARACTER SET KEYBOARD" filed Nov. 22, 2016 which claims priority of provisional application U.S. Ser. No. 62/263,217 filed Dec. 4, 2015 entitled Reprogrammable Multi-Host, Multi-Character Set Keyboard.

BACKGROUND

Field of the Invention

Embodiments of the invention relate to a keyboard. More specifically, embodiments of the invention relate to a wireless keyboard with multi-host capability that permits customization of character sets and a tool for such customization and access to the existing layout.

Background

Portable devices such as smartphones like the iPhone™ and Android™-based phones, as well as tablet computers such as the iPad™, have become ubiquitous and their market share in the overall computing field has continued to grow.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

FIGS. 7A and 7B are diagrams of a system of one embodiment of the invention.

DETAILED DESCRIPTION

Figure 1:
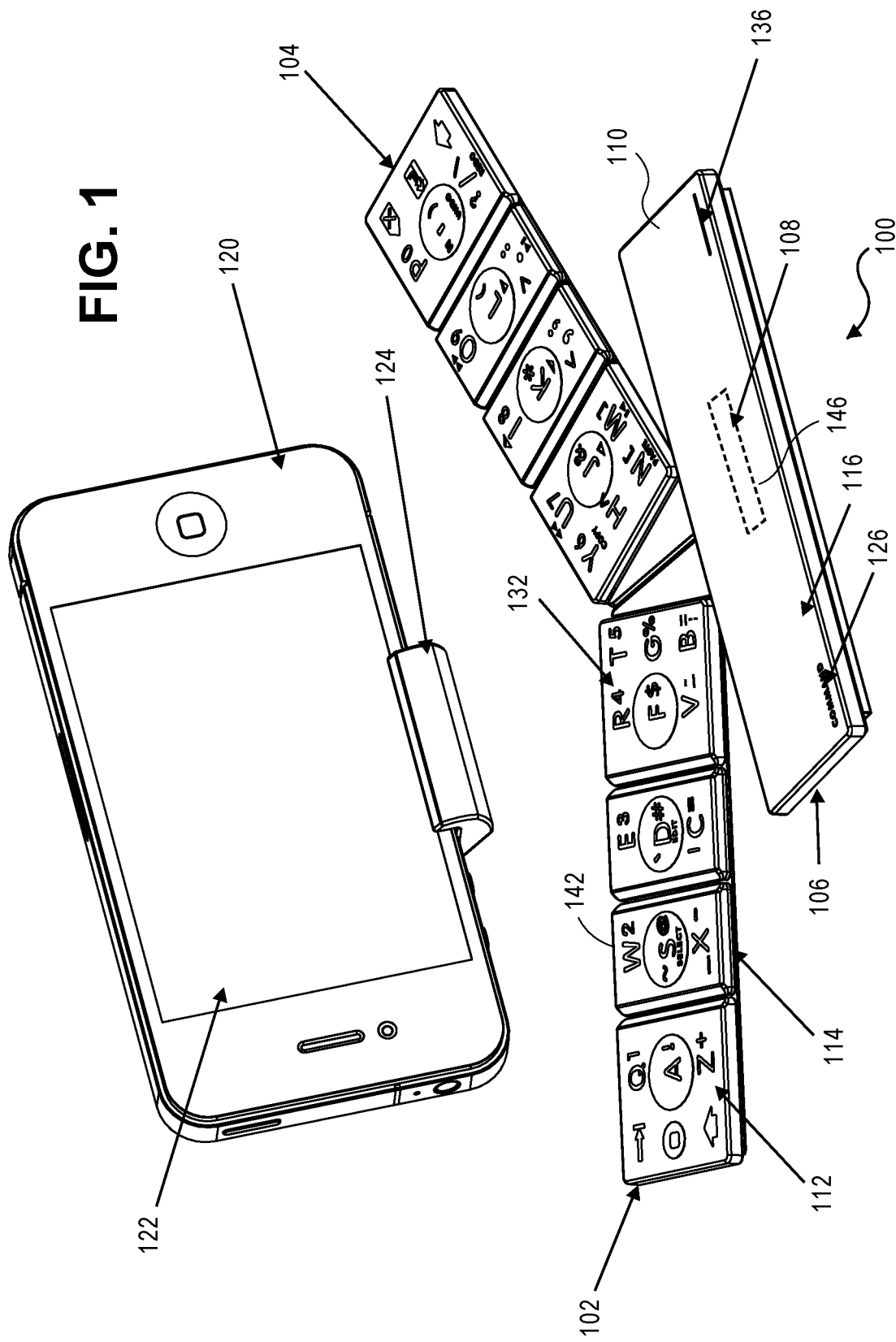
FIG. 1 is a diagram of a system of one embodiment of the invention.

FIG. 1 is a diagram of a system of one embodiment of the invention. A wireless keyboard 100 is paired with a recipient device 120. The recipient device 120 having a display 122 is retained at a desirable work angle by a dual function stand/clip 124. Recipient device 122 may be a smartphone or tablet computer. Herein, recipient device is alternatively referred to as a "host." It is also envisioned that the keyboard of the embodiments in the instant invention may be used with desktop computers or with any other electronic device for which a keyboard is desirable. "Recipient" as used herein is deemed to include any device that receives inputs from the keyboard.

The key array 102, key array 104 and spacebar 106 are all individually and collectively frameless. This reduces the space required to supply the keyboard functionality. Once assembled, as shown, the keyboard has an "underlined V" shape. This underlined V-shape provides greater ergonomic comfort in reduced space relative to conventional keyboards comprised of staggered linear rows of buttons. Nevertheless, other embodiments of the invention may occupy greater space and have a standard linear arrangement. In one embodiment, assembling the device turns it on and disassembling the device turns it off. As discussed below, some functions may be enabled when the device is assembled.

The keys on each array 102, 104 are formed of individual keycaps 112 and a key base 114 that forms a substrate for all keys of the array. Thus, in the embodiment shown in FIG. 1, there are eight keycaps 112 (four each for key array 102 and key array 104) and two key base substrates (one each for key array 102 and 104). In this embodiment, there are 2 different sizes of keycaps; one for large keys such as key 132 and one for smaller keys such as key 142. In one embodiment, keycaps 112 and key bases 114 are injection-molded from a thermoplastic. In one embodiment, they are molded from polycarbonate.

Each key is associated with at least three primary functions. For example, key 132 is associated with R, T, F, G, V and B as its primary letter functions. For example, pressing the lower right hand corner of key 132 would fall within the B zone and result in the key event actuating the B function. Each key is spaced at least 19 mm from its neighboring key, consistent with international standards for touch-typing. The character legends on a single key are closer together to reduce the throw distance for the character selections by a same single finger. Tests indicate this reduced throw lessens the physical work and contributes to faster touch-typing. In one embodiment, zones, which may overlap, are defined on each key such that actuation of the key by a finger within the zone triggers the actuation of the associated function. The alphanumeric and symbol character are each directly available when the respective layer is active. That is for example, every letter of the alphabet is accessible in a single strike (no chording required) when the alpha layer is active. Caps Lock and Shift locations are used to get capital letters in the normal manner.

While the embodiment shown includes a single key for each finger. It is within the scope and contemplation of the invention to split each of the large keys (index and pinky finger keys) into 2 distinct physical keys. In such, embodiment up to twelve physical keys may be present on the keyboard. In such embodiment each key would have three primary functions accessible at a first layer.

Spacebar 106 includes a cover 110 having a top surface 116. In one embodiment, cover 110 includes an internally thinner region 108, which, while imperceptible externally, provides display functionality responsive to the actuation of, for example, LEDs within the spacebar 106. LED's by nature have at least two states ON and OFF. By appropriately using these LEDs it is possible to convey information, alerts etc. to a user. This type of display may also be useful on conventional keyboards to unobtrusively convey information e.g. from within the spacebar. This display may be used to, for example, show battery life, communications status, caps lock state, layer of functions available, or other useful information to a user directly on the spacebar 106. Additionally, all or part of the surface 116 may be provided with underlying capacitive sensors to detect input at different regions/zones of the spacebar 106. A specific function can be assigned to distinct zones. For example, in one embodiment, three distinct zones are provided that are separately interpretable, Left corner 126, right corner 136, and the center (rest) 146. It is useful to have the different zones be easily tactilely identifiable with out requiring a user to look at the keyboard. By selecting the corners those zone 126, 136 can readily be found by feel, the center 146 (in this embodiment) is anything that is not in the corner and therefore can also easily be found without looking. Some embodiment may include additional capacitive sensors that interpret gestures on the surface 116. In some embodiments, gestures can be used to switch modes or layers of the keyboard 100.

Figure 2:
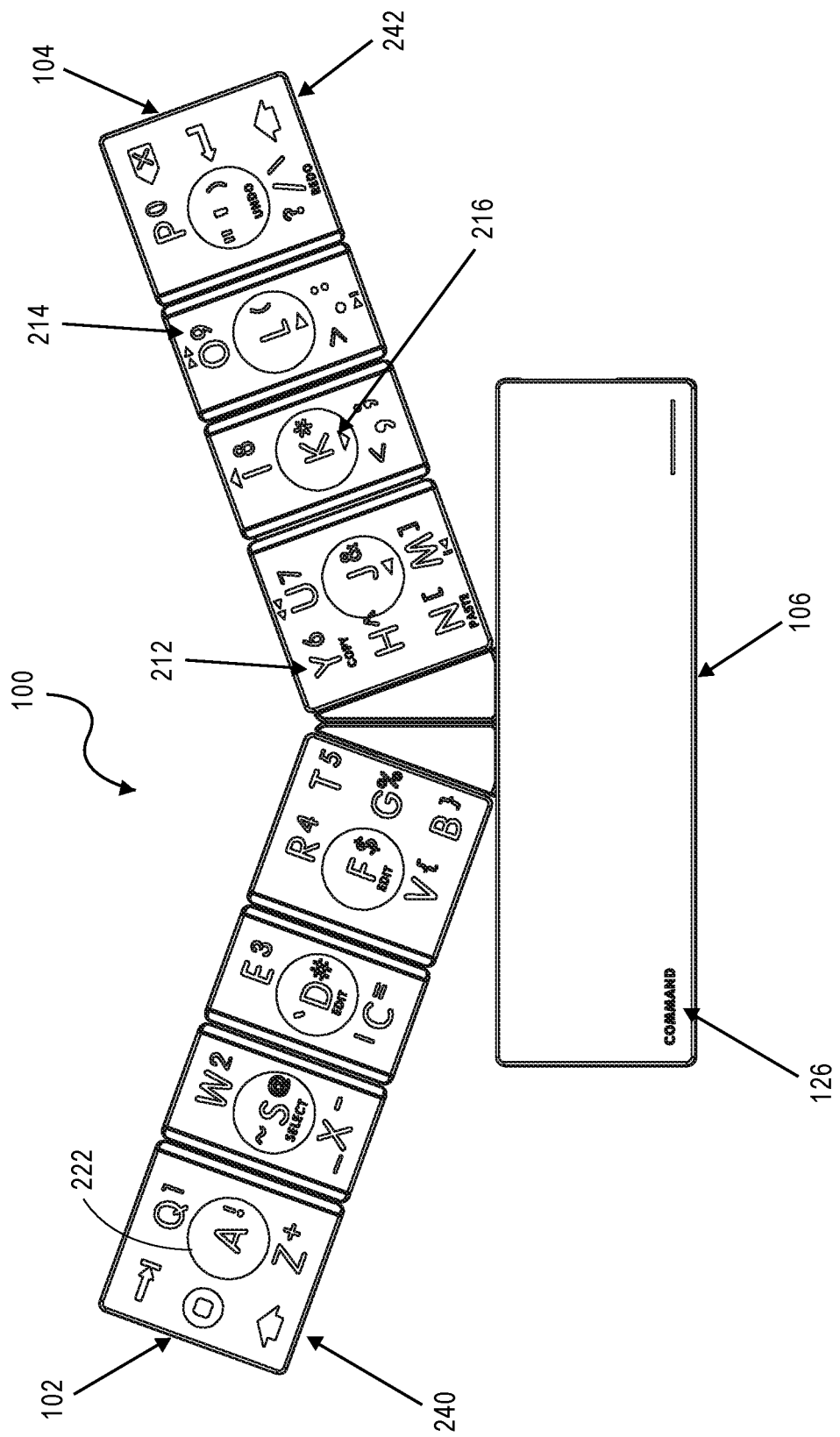
FIG. 2 is a diagram of a compact keyboard of one embodiment of the invention.

FIG. 2 is a diagram of a compact keyboard of one embodiment of the invention. Keyboard 100 may communicate wirelessly with a host device (not shown). In one embodiment, a Bluetooth module within keyboard 100 allows it to communicate with any Bluetooth-enabled device. Thus, embodiments of keyboard 100 may communicate with smartphones, tablets, laptops, desktop computers, etc. A processor within the keyboard interprets key events and transmits them to the host. Other embodiments may be wired to or otherwise physically connected to a host.

In one embodiment, keyboard 100 provides three layers of functions in at least some locations on the keyboard. As used herein "location" refers to both an entire key where the key is mapped to a single character, and a region of a key where a key is mapped to multiple characters, but the region is uniquely mapped to a character. "Uniquely mapped" means that, based on the existing state of the keyboard, actuation of the location unambiguously results in a single character or function. Thus, for example each alpha character on keyboard 100 is uniquely mapped to a location within the first layer 212, a second layer 214, and a third layer 216. Within this patent application, "layer one" is used interchangeably with "first layer," "layer two" with "second layer," and "layer three" with "third layer." In a default state the first layer is active. Explicit details of each layer and the changing of the mode to access the different layers are discussed below.

Figure 3A:
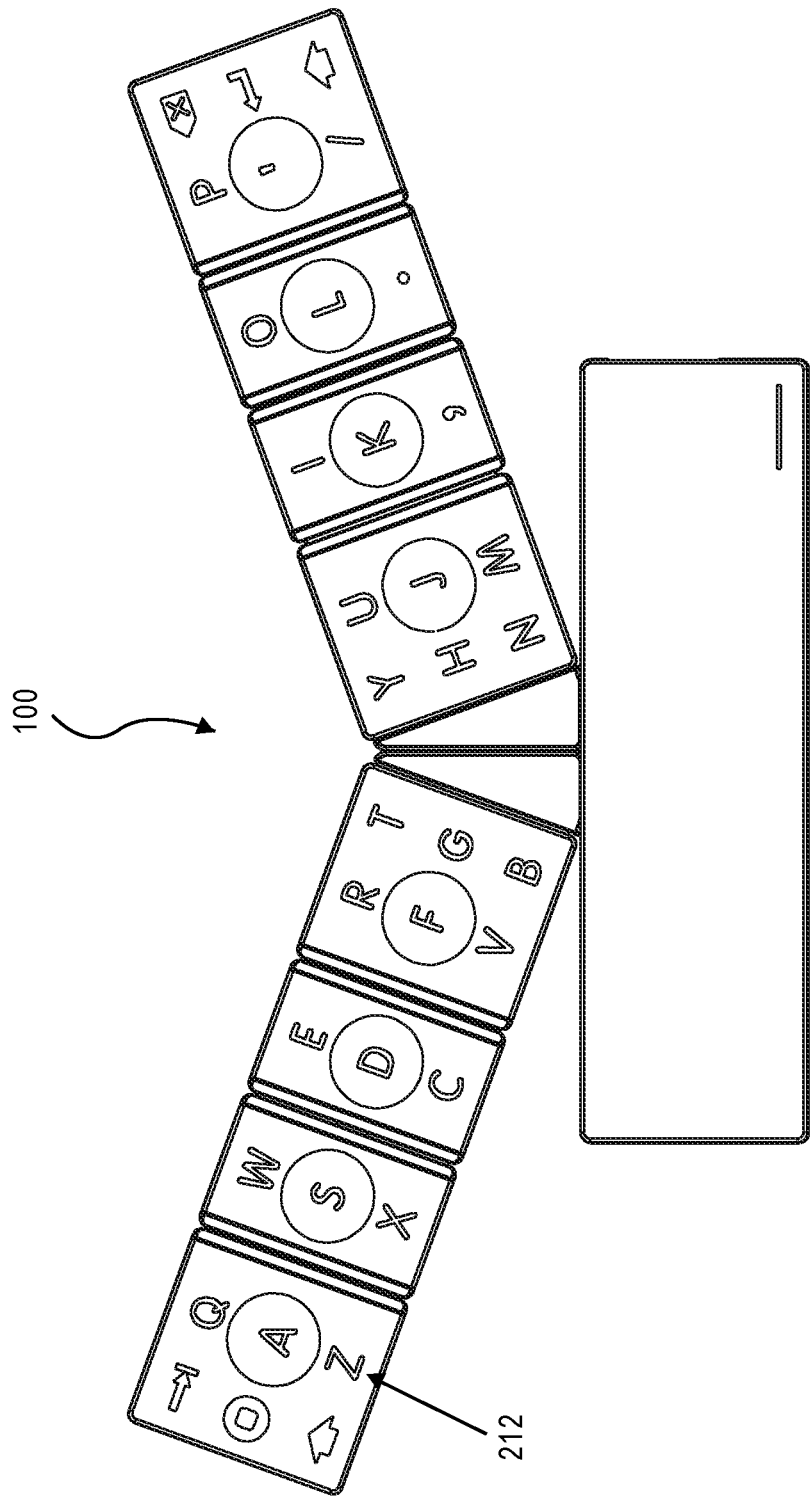
FIGS. 3A-C depict the keyboard of FIG. 2 with only a first, second and third layers of functions respectively visible.
Figure 3B:
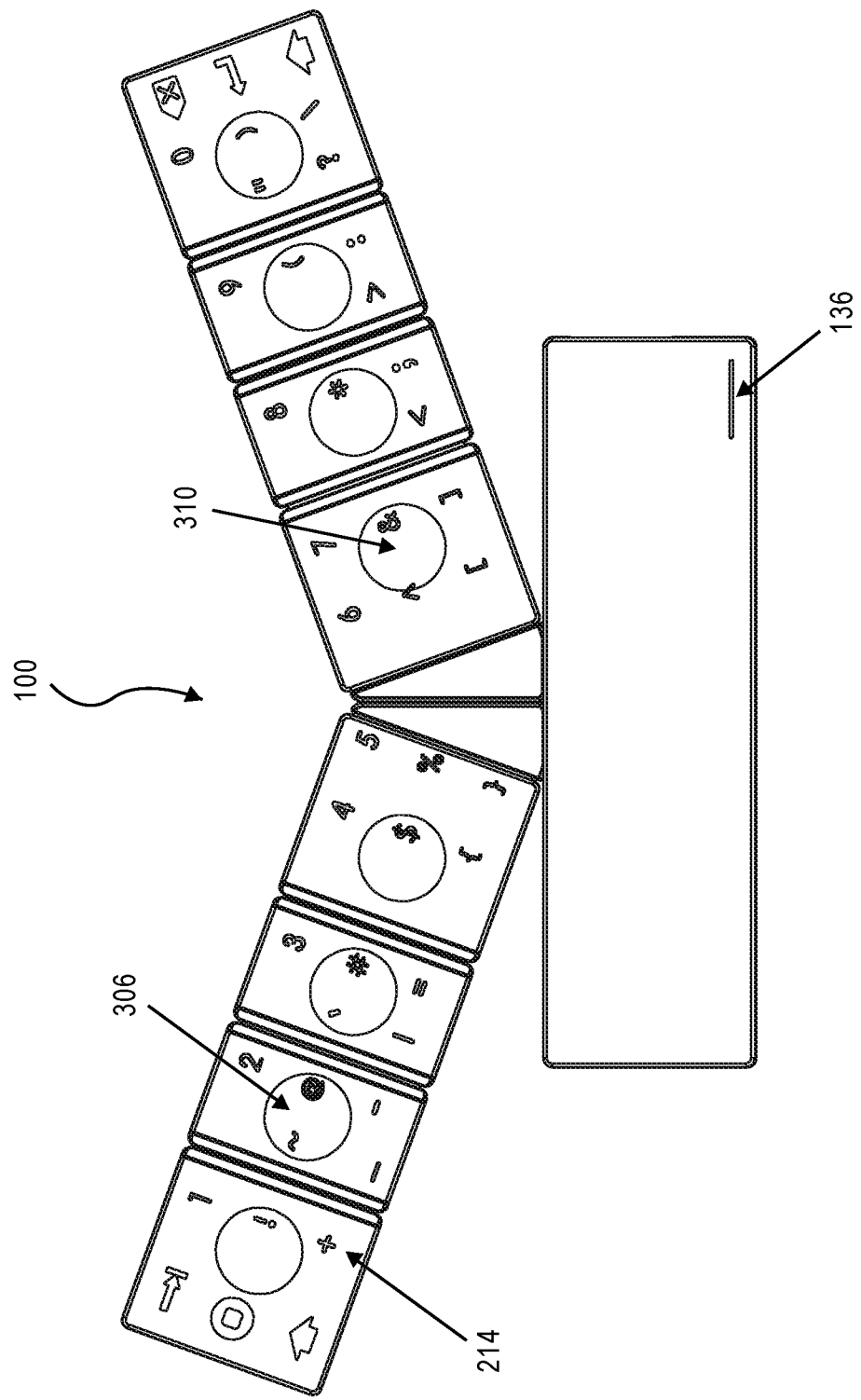

Keyboard 100 includes a spacebar module 106, a right hand key array 104 and a left hand key array 102. Spacebar module 106 provides space bar functions to the keyboard. Right hand key array 104 includes four distinct mechanical keys that are collectively mapped to all the alphanumeric functions typically accessed by the right hand of the user on a touch-type keyboard, in this example a QWERTY layout keyboard. A left hand key array 106 similarly maps to all of the alphanumeric functions typically accessed by the left hand of a user. The letters (alpha characters) form the majority of the first layer 212 (details of the first layer are depicted in FIG. 3A). Less commonly used characters are efficiently distributed as shown. In one embodiment, most of these functions are distributed to be accessed by a same finger as would be the case on a conventional keyboard. The numbers and these less commonly used characters form the second layer 214 of functions associate with location on the keyboard (details of the second layer are depicted in FIG. 3B).

Figure 3C:
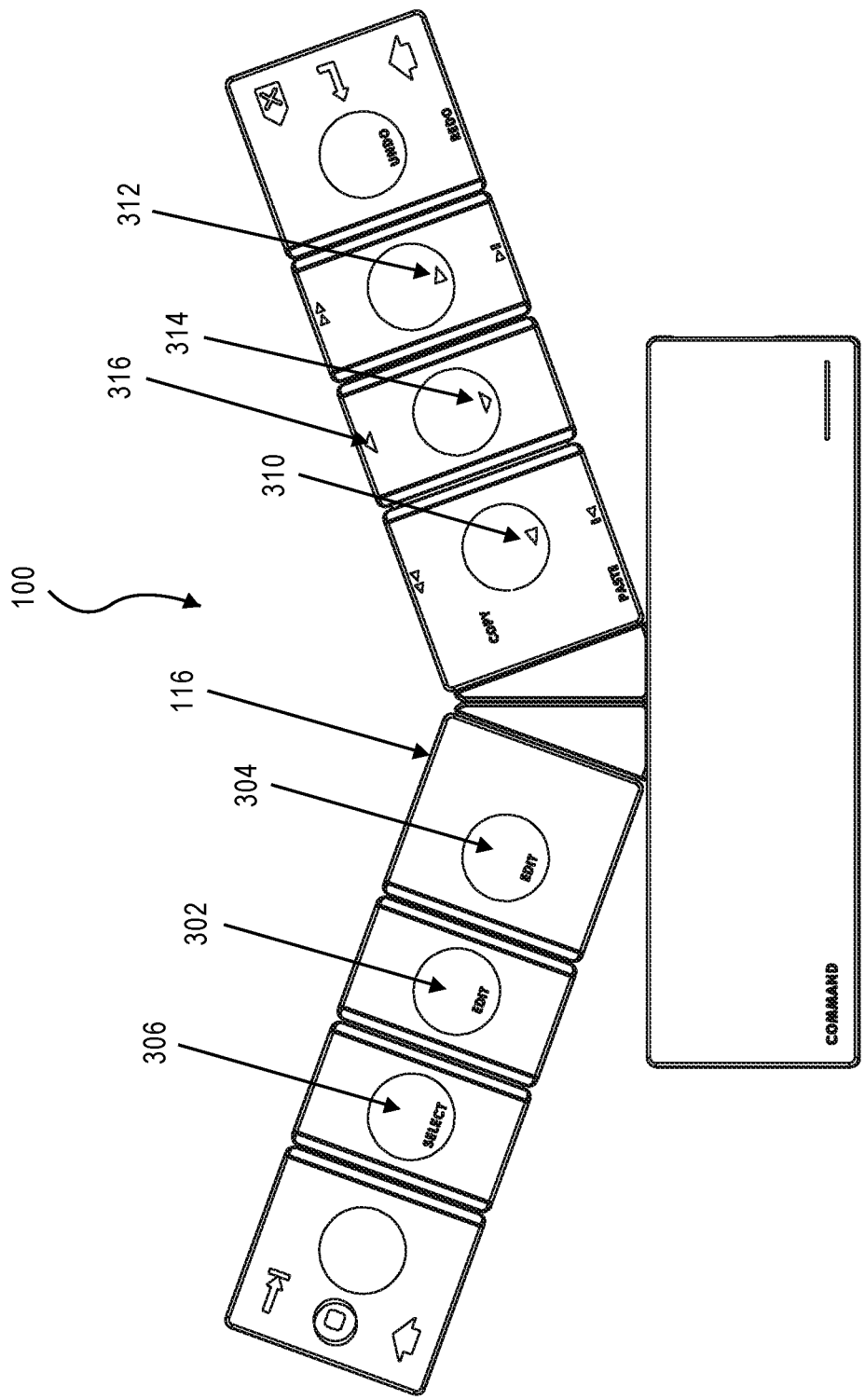

Additionally, cursor control and special functions are provided by the keyboard 100 at a third layer 216 (details of the third layer are depicted in FIG. 3C).

To permit a user to visually identify the functions on the keyboard both in the context of hunt-and-peck typing, and the context of lesser-used functions where even touch typists require visual confirmation, all three layers of functions can be represented at their locations on the keyboard 100. However where different character set or different mapping are use alternatively, the fixed indicia on the keys may not match such customization. As discussed below, one embodiment off the invention provides a visual prompt on the screen of the host such that the user may always know what functions are currently available at particular locations.

Keyboard 100 defines a set of home row locations, one for each finger. As used herein "finger" is any of the four digits of each hand excluding the thumb, "thumb" refers to the thumb of either hand and "digits" refers to any of the fingers or thumbs. Thus, in a QWERTY style keyboard, key array 102 has the home row location defined at the "A" location, the "S" location, the "D" location and the "F" location. The right hand key array 104 has home row locations defined at the "J", "K", "L", and the apostrophe locations. This represents a repositioning of the apostrophe location to the home row instead of the ";". But in usage today the apostrophe has higher usage than semi colon and colon and is therefore more desirable to be placed on the home row in the first layer 212. In one embodiment, a rounded well 222 defines each home row location. The rounded concave well 222 provides easy tactile identification of the home row location on the key surface for a user. Other embodiments of the invention may use some other tactile indication such as a roughened area, a raised area, or other tactilely-discernible feature that permits a user to locate the home row without looking. It is believed that some tactile indication of location is highly desirable for touch-typing.

As noted above, to compactly provide all of the functions of a standard keyboard as well as some other desirable functionality, keyboard 100 provides at least three distinct layers of functions at some locations on the keyboard. The alphabetic characters 212 exist at one layer, numbers 114 as well as special characters exist at a second layer 214, while cursor control functions and some other special functions exist at third layer 216. For example, the "K" location provides capital K and lowercase k in layer 212, an "*" in layer 214, and a down arrow function in third layer 216. The functions on the left edge 240 (tab, caps lock, and shift) and the right edge 242 (back space/delete, return, and shift) are available at all layers in one embodiment. In one embodiment the keyboard permits concurrent actuation of a letter location, and a second location, e.g. the shift location, on the same physical key. The layers are explained in greater detail with reference to FIGS. 3A-C below.

FIGS. 3A-C depict the keyboard of FIG. 2 with only a first, second and third layers of functions respectively visible. FIG. 3A shows the functions accessible at a first layer 212. This includes all of the alphabetic characters, the shift function, the caps lock function, the tab function, the delete function, the return function, the apostrophe, the backslash, period and comma. In one embodiment, the double quote grammatical symbol, the "?", "<" and ">" are also first layer 212 functions accessible as a shift of the apostrophe, "/" ",", and "." locations respectively. The shift may be the "up-shift" arrow depicted in the outer lower corners of the keyboard, or other function key shifts that may be provided as desired, such as the command key or related keys. In such embodiments these symbols are represented on the key surface in the layer one 212 color e.g. silver. Such an embodiment may be used to increase consistency with existing standard keyboards. In other embodiments these symbols form part of layer two 214 as shown in FIG. 2B. Where the symbol is not accessible in the first layer 212 it would be shown on the surface of the key in the layer two 214 color e.g. green. In normal operation, when in the layer two 214 state, all of these characters are accessible uniquely with a single key press by a finger at the location of the corresponding indicia on the key surface. Capacitive sensors within the keyboard detect the location of the user's finger on the key surface so that the key press is uniquely identified as corresponding to the desired function.

FIG. 3B depicts the keyboard of FIG. 2 showing only the functions accessible at a second layer in one embodiment of the invention. In one embodiment, layer two 214 functions are accessed via a selection function 136 on the spacebar module. The line in right corner location 136 on the spacebar module 106 is, in one embodiment, instantiated in the same color (e.g. green) as the layer two functions on the other key arrays 102, 104. In one embodiment, actuation of location 136 on the space bar module 106 with a single tap transitions to layer two 214 for the immediately succeeding key event. Tapping location 136 twice in rapid succession latches the keyboard into layer two 214 until the latch is released by, for example, a further actuation of location 236, or a time-out. Alternatively, layer two 214 can be maintained by continuous actuation of location 136. In some embodiments, when the keyboard 100 detects that the user has lifted his fingers off the home row, it may be configured to automatically shift to another layer. For example, if the user moves his hand away to scan the green legends, the keyboard may automatically enter the layer two 214 state for a period of time to allow the user to select a green legend function without pressing a green shift key. If the keyboard detects the return of fingers to home row, the keyboard can be set to automatically return to layer one 112 functionality. Such automatic detection and shifts may also be accomplished by other means such as monitoring keyboard entry data. Modes may be maintained for an unlimited period of time for example, until a certain key input is received.

This layer 214 includes the numbers 0-9, each located to be associated with the same finger that would be used for that number on a standard keyboard. Additionally, the symbols that are the shifts of the numbers are directly accessible in this layer without a shift, and immediately adjacent so as to associate with the same finger as on a standard keyboard. Finally, the lesser-used symbols such as brackets and less common punctuation are distributed in this layer. On the small keys, that is, those keys used by the middle and ring fingers, two symbols may be accessed at one location e.g. location 306. This is performed using the normal "up-shift" function, as with shifting between upper and lower case in the alpha layer 112. In the nomenclature of this embodiment, the symbol on the left of the key is the shifted variant, and the symbol on the right is directly accessible without a shift. For example, in this layer 214 the "@" is directly accessible by the ring finger at the home row location 306 without a shift. The "~" is accessible as a shift of that same home row location 306. In one embodiment all of the large keys, i.e. those keys accessed by the index and pinky fingers, have a single layer two 214 function per location, and hence can be accessed without a shift. For example, at layer 214 the "]" can be accessed without a shift by actuating the "M" location, and the "[" can be accessed without a shift by actuating the "N" location, which is below and to the left of the "J" home row location 310. Access to symbols that are commonly used together, such as the brackets, has been found to enhance usability when those symbols can be accessed by the same finger.

The functions of this layer are depicted in a second color different from the characters in the first layer. It is desirable that the second color be less obtrusive than the first color. In one embodiment, the functions of this layer are depicted in metallic green ink. Testing has shown that metallic green ink (such as Pantone 10316C) performed best in bright and dim ambient light conditions to provide both good visibility in low light as well as sufficient subtlety relative to the alphabet color when viewed in bright light. Other embodiments may use other inks, such as Pantones 10317C or 10318C which have also be found to have desirable characteristics.

FIG. 3C shows only the third layer. In one embodiment, the indicia for this layer are blind-embossed on the keys. As such, indicia are molded recesses that have the same color as the underlying plastic of the key. Alternatively, they can be indicia that are raised relative to the surface of the key, and also molded in the same plastic and color. This layer provides special functions such as cursor control functions. Left arrow 310 occupies the home row J location, right arrow 312 occupies the L home row location, down arrow 314 occupies the home row K location and up arrow 316 occupies the I location. Cursor control locations 310-316 form a typical inverted-T cursor control pattern familiar to users. Significantly, however, because the cursor control is embedded in the home row, it is faster and more convenient to access. As is described below, the "edit" locations 302 and 304 occupy the D and F home row locations, and permit access to this layer 216 and in particular to the embedded home row cursor control functions 310-316. Similarly, the select function at the S home row location 306 converts the cursor control functions into selection functions. Other useful functions such as copy, paste, undo, redo, go to beginning of line, go to end of line, go to next word, select next word, go to previous word, select previous word, go to next sentence, go to previous sentence, select next sentence, select previous sentence, go to next paragraph, select next paragraph, go to previous paragraph, select previous paragraph, page up, page down, go to start of page, go to end of page, go to start of document, go to end of document, an edit control, a cursor selection control for a zone of text, play, pause, fast forward, rewind, skip forward, skip backward, volume up, volume down, mute, and a media control may be provided at layer three 216.

Figure 4:
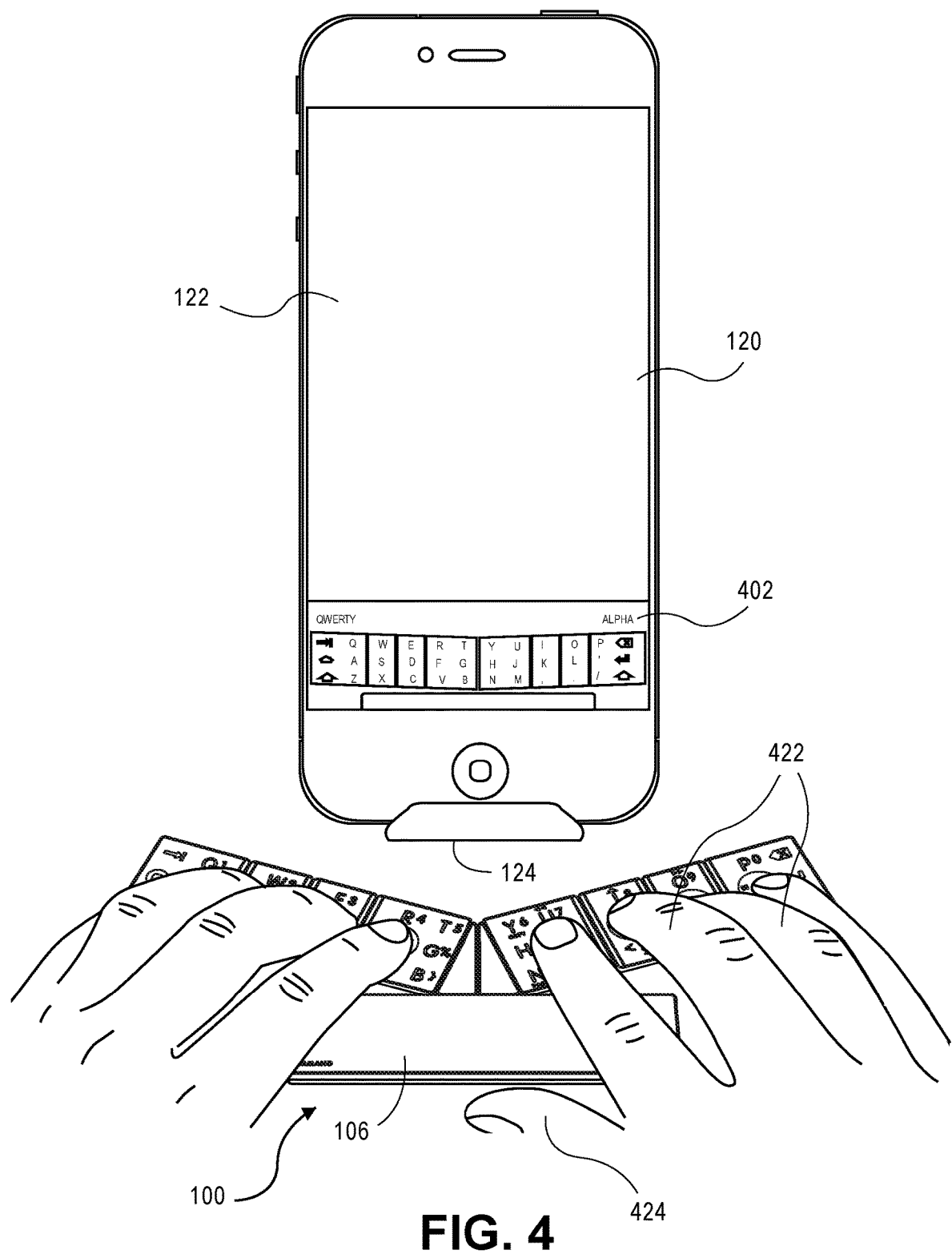
FIG. 4 is a diagram of a system of one embodiment of the invention. Host 120 is shown retained in clip 124 in a portrait orientation.

FIG. 4 is a diagram of a system of one embodiment of the invention. Host 120 is shown retained in clip 124 in a portrait orientation. Keyboard 100 is shown with a user's fingers 442 on home row. Spacebar 106 is easily accessible with thumb 424 while fingers 422 remain on home row. Display 122 of host 120 shows a prompt 402 of the available functions of keyboard 100. That is, prompt 402 shows the functions that are available at the presently accessible layer of keyboard 100. In this instance, the alpha layer. Manners in which the prompt 402 may be caused to display are discussed in greater detail below in connection with FIG. 8.

Figure 5:
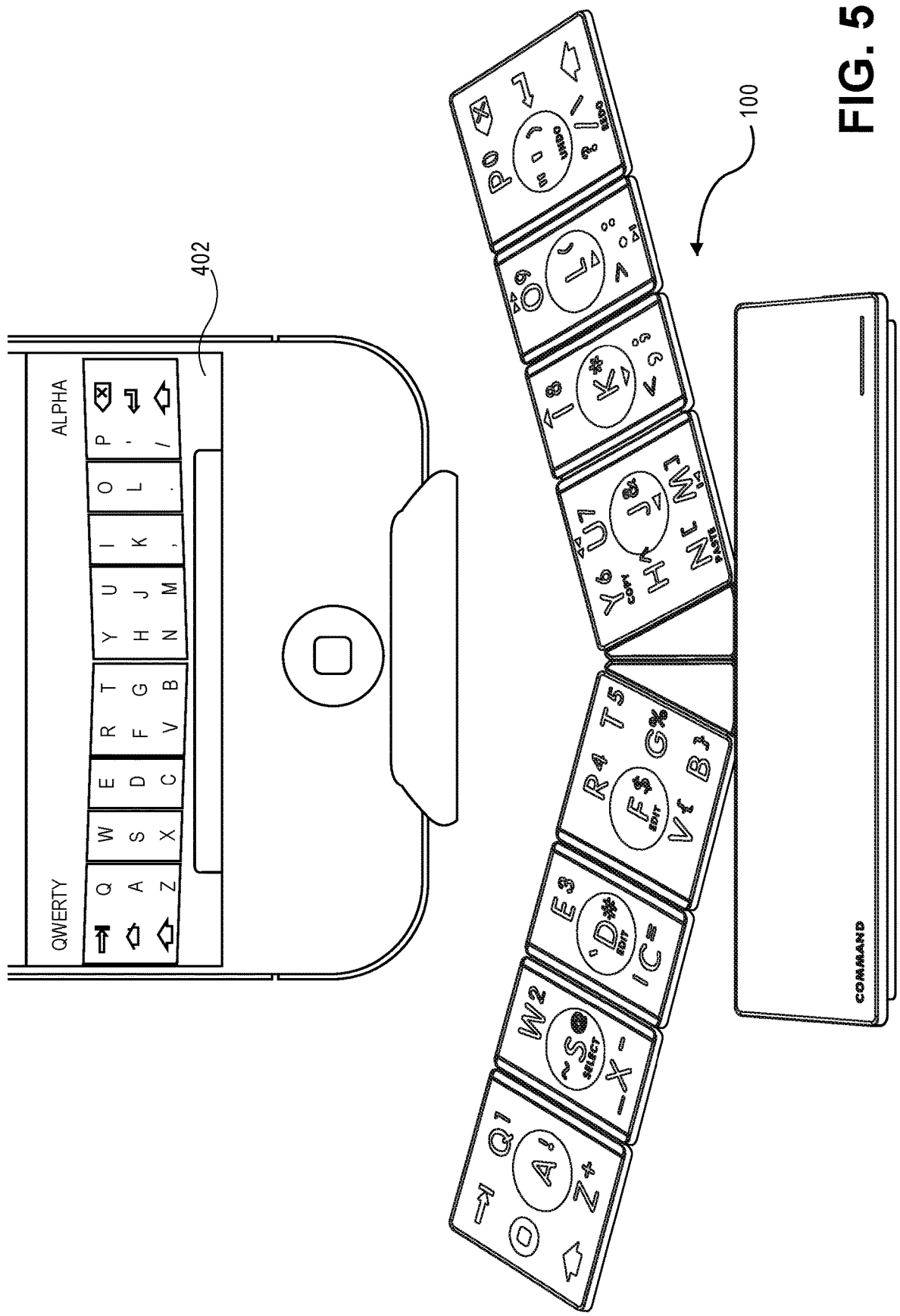
FIG. 5 shows an enlarged view of the onscreen prompt of FIG. 4.

FIG. 5 shows an enlarged view of the onscreen prompt of FIG. 4. The onscreen prompt 402 is depicted so that a user can instantly discern the relative direction required to move each finger to reach a particular function. That is, the prompt 402 is segmented consistently with the keys of the physical keyboard 100, and allows identification of the respective functions without moving the fingers from home row or looking down at the keyboard. The manner in which the prompt responds to user action is explained in more detailed below with reference to FIG. 8.

Figure 6:
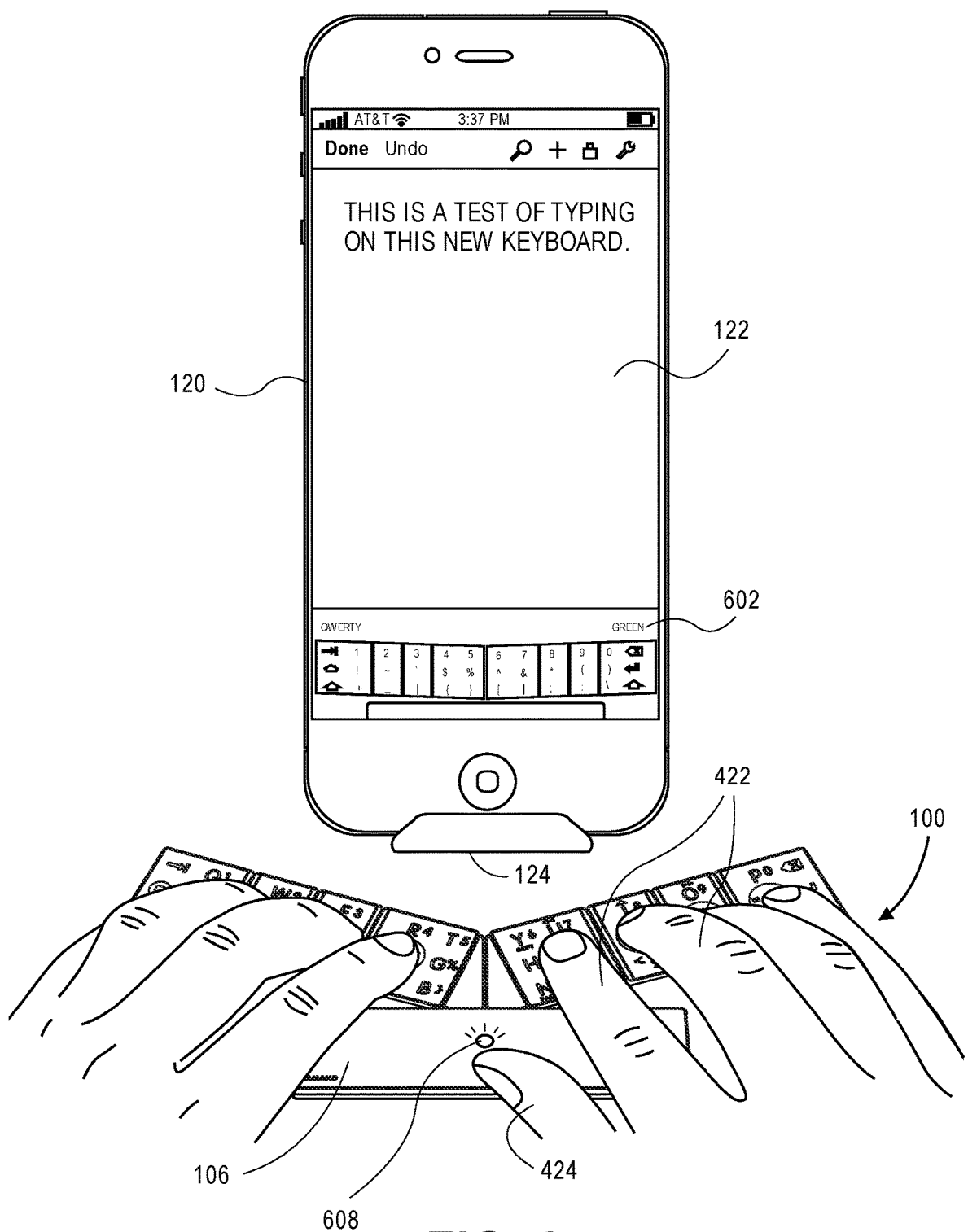
FIG. 6 is a diagram of a system of one embodiment of the invention.

FIG. 6 is a diagram of a system of one embodiment of the invention. Host 120 with display 122 is shown depicting prompt 602 for the green layer (second layer) of one embodiment of keyboard 100. In this diagram fingers 422 are shown residing on home row while thumb 424 actuates spacebar 106. In one embodiment, holding the spacebar down for a threshold period of time causes a transition from the alpha layer to the green layer. In one embodiment, once the transition occurs, LED 608 is illuminated to indicate that the green layer is now active. In one embodiment, when the green layer becomes active, the onscreen prompt 602 will present the functions available in the green layer. In one embodiment, the threshold period after which the spacebar actuation will be interpreted by the processors within the keyboard as a layer change is longer than 300 milliseconds. In other embodiments, the green layer may be accessed by a gesture or action of a finger or fingers on a key or keys of arrays 102, 104.

FIG. 7A is a diagram of a system of one embodiment of the invention. While FIG. 6 shows that holding spacebar down, for example, thumb 424, will shift the green layer, in other embodiments, tapping the left corner region 126 with thumb 424 also enters the green layer. In some embodiments, a single tap will display the green layer transiently until the next character is typed, and a rapid double-tap will latch into the green layer until the latch is released.

The green prompt 602 shows the spatial relationships of finger positions to the actual physical keys of keyboard 100. The onscreen prompt 602 avoids the need to search the legends on the physical keys for particular characters. It allows the user to keep their eyes focused on the screen, even when looking for legends, while the fingers maintain contact with the keys, to locate entirely by feel. Especially in the context of a compact keyboard where the fingers occupy a large percentage of the surface area of the keys, the onscreen prompting is more easily visible and increases ease of use. Spacebar 106 also includes pressure sensors. In one embodiment the green layer may be accessed by tapping the spacebar without actuating it. In other embodiments, the green layer may be accessed by a gesture or action of a finger or fingers on a key or keys of arrays 102, 104.

Figure 7B:
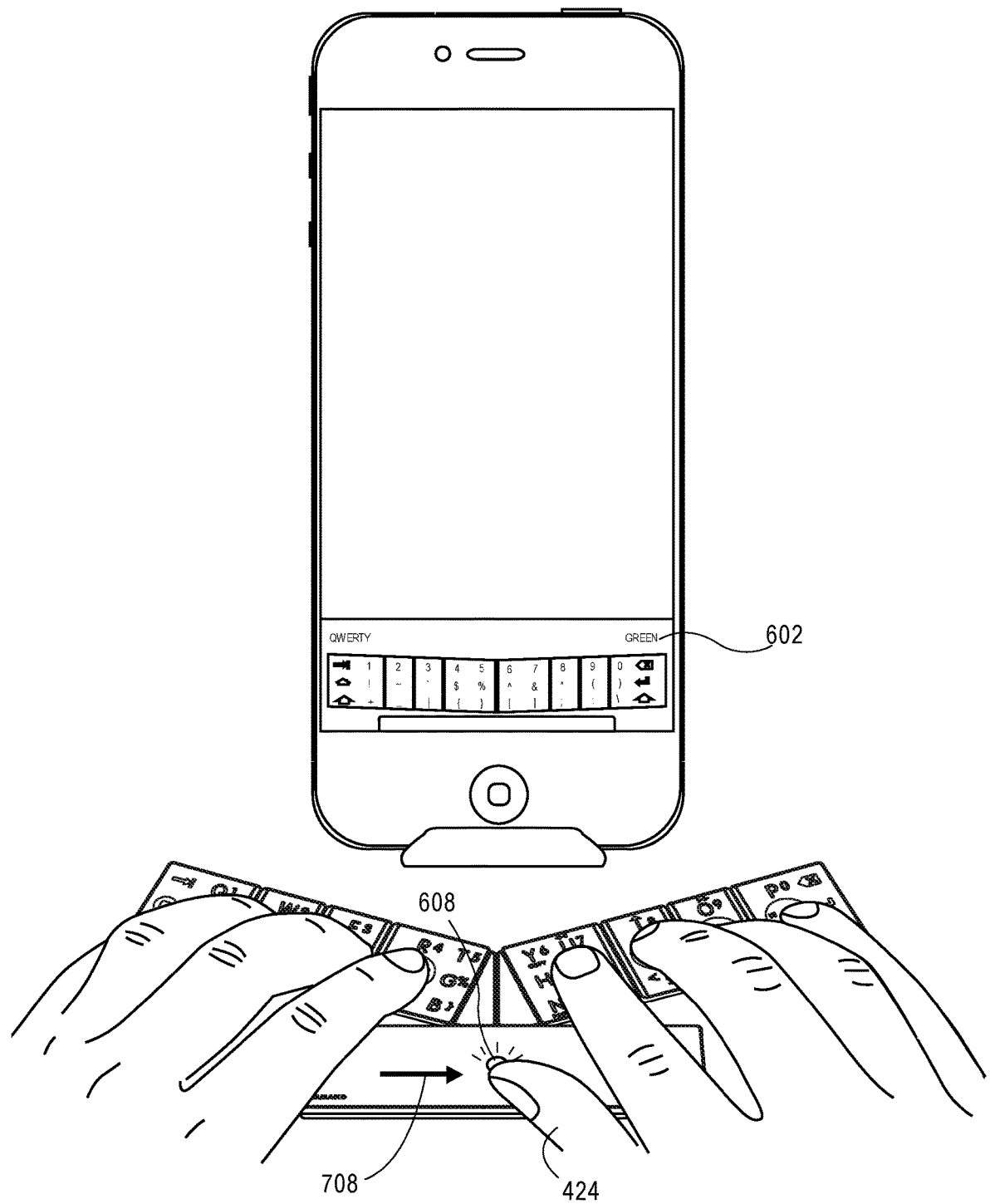

FIG. 7B is a diagram showing an alternative way to switch layers. In one embodiment, a swipe 708 will a thumb 424 on the surface of spacebar also transitions the keyboard to a different layer. For example, from the alpha layer to the green layer. It is envisioned that repeatedly swiping thumb 106 can slide through multiple layers where an arbitrarily large number of layers can be accessed by repeated swiping. For example, in addition to the QWERTY alpha layer and the green layer, a user may install other languages such as Japanese, Korean, etc. or other layouts such as Colemak, Dvorak, etc. It is possible to swipe repeatedly to access other map layers. Additionally, while a horizontal swipe is depicted, other embodiments use a vertical swipe. Direct access to different key maps is explained below with reference to FIG. 13.

Figure 8:
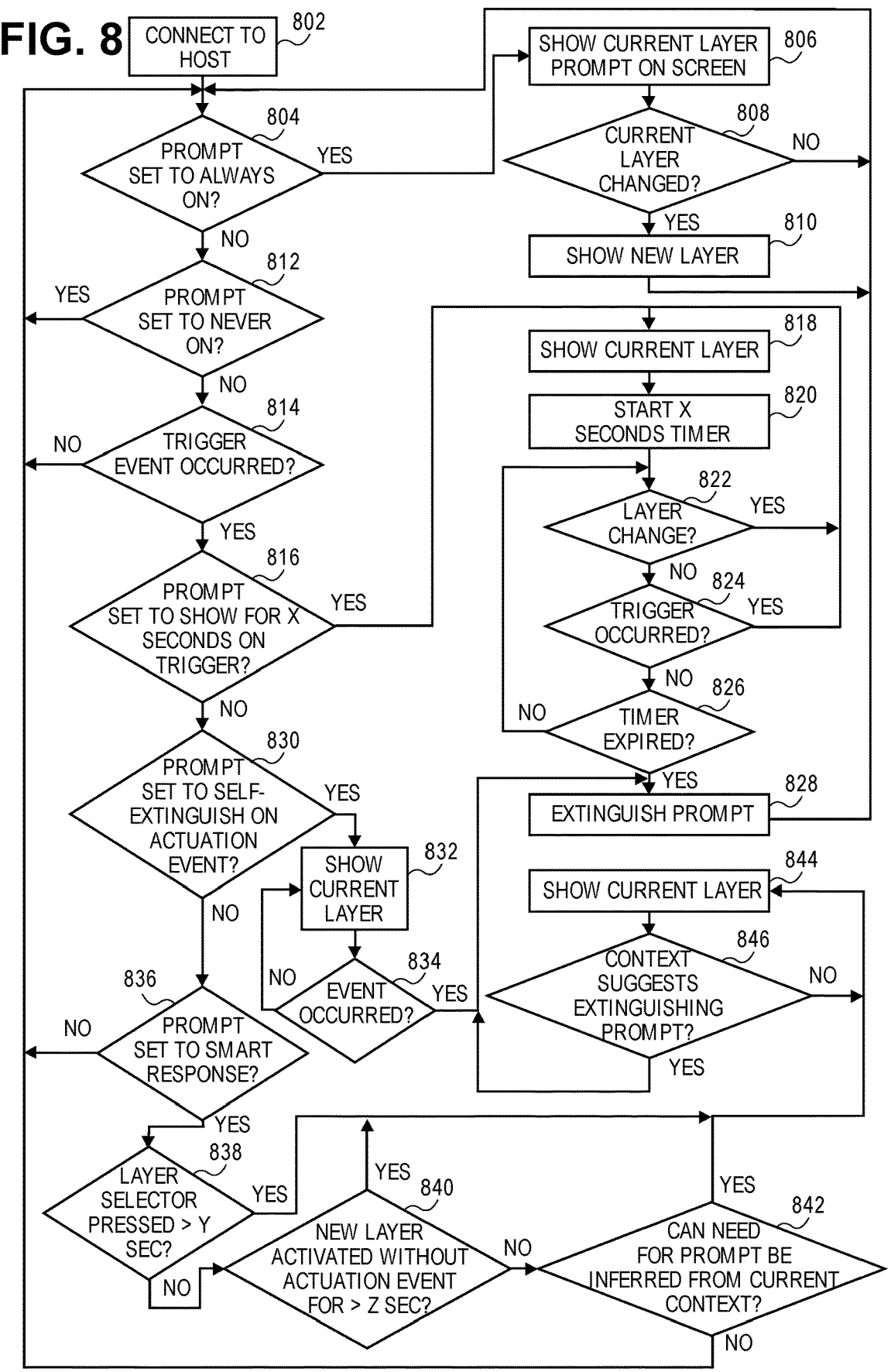
FIG. 8 is a flow diagram of handling of the onscreen prompt in one embodiment of the invention.

FIG. 8 is a flow diagram of handling of the onscreen prompt in one embodiment of the invention. At functional block 802, keyboard connects to the host. In the case of a new host, the keyboard may need to go through a Bluetooth pairing scheme. However, the onscreen prompting is not limited to a Bluetooth environment or any particular protocol used. There may be a range of preferences that a user can configure to affect when, if at all, the prompt will be displayed. A simple user interface with for example radio buttons can be provided for the user to set their preferences.

Once connected to the host, the processor within the keyboard identifies whether the prompt preference is set to "always on" at decision block 804. If the prompt is set to always on, the prompt for the current layer is shown on the screen of the host at functional block 806. Then, at block 808, a determination is made whether a layer change has occurred as a result of some user action or inference by the processor within the keyboard. For example, actuating the spacebar in a manner mapped to a layer change holding down the edit keys to move into edit mode, for example, is a direct action. In some embodiment, sensor within the keyboard, detect both key actuation and finger presence on the keys. The activity monitored permits algorithms executing within the keyboard to infer when a user may be "searching" for a character or symbol. For example, removal of fingers from home row may in some embodiments result in an inference that a non-alpha character is desired and precipitate a transition to the green layer, while return of the fingers may be inferred to indicate a desire to return to the alpha layer.

If a layer change is deemed to have occurred, the prompt for the new layer is shown at block 810. If no interchange has occurred or after the new layer is shown, the system cycles back through decision block 804. In this manner, if the user settings change such that the user no longer desired to see the prompt always on, or if at block 804 originally, the prompt was not set to always on, a determination is made at decision block 812 whether the prompt is set to "never on." If the prompt is set to never on, no prompt is displayed. Otherwise a determination is made at decision block 814 whether a trigger event has occurred. Trigger events may include for example a layer change, a delay between characters exceeding a threshold, pairing with a new device and the like. If a trigger event has occurred, a determination is made at decision block 816 whether the user preference profile is set to show for x seconds on the trigger event. In some embodiments, a user may be able to customize the number of seconds in addition to providing an indication of what will constitute a trigger event.

Additionally, trigger events may be dictated by the firmware within the keyboard. If the preference is set so the prompt will be shown for x seconds responsive to the trigger. The current layer prompt is displayed at box 818. An x second timer is started at block 820. A determination is made at block 822 if a layer change has occurred. If no layer change has occurred, a determination is made if a further trigger event has occurred at decision block 824. If either the layer change has occurred or a new trigger event has occurred, the current layer is shown and the timer restarted at blocks 818, 820 respectively. If neither a layer change nor a trigger event have occurred, a determination is made at block 826 whether the timer has expired. If the timer has not expired, the system continues to watch for a layer change or trigger event. If the timer has expired, the prompt is extinguished at block 828. Then the process repeats.

When the prompt is not set to remain for x seconds on a trigger, a determination is made at block 830 whether the prompt is set to self-extinguish on an actuation event. For example, in some embodiments, a layer change will trigger the prompt to appear for the new layer and the prompt will extinguish immediately on actuation of a character in that layer. To that effect, at block 832 the current layer is shown if the prompt is set to self-extinguish. At block 834, a determination is made whether the event has occurred. Once the event occurs, the prompt is extinguished at block 828, and the process repeats.

If the prompt is not set to self-extinguish, a determination is made if the prompt is set to smart response. If the prompt is set to smart response at decision block 836, a determination is made at block 838 whether a layer selector has been pressed for greater than y seconds. If a layer selector has not been pressed for greater than y seconds, a determination is made at block 840 whether a new layer has been added without an actuation event for greater than z seconds. Empirically, it has been found that holding the layer selector for long periods of time or long delays before an actuation event after entering a new layer are often reflective of a user's need to find a character in the new layer. Finally, if neither of these conditions is true, at block 842 a determination is made if there is any other basis by which the need for a prompt can be inferred from the current context. If any of these conditions are met, the current layer is shown at block 844. Thereafter, a determination is made at block 846 whether the context suggests extinguishing the prompt. Among the things that might suggests extinguishing a prompt are a layer change, settings change, or other event such as rapid typing that indicates the prompt is no longer necessary. If the context indicates that the prompt should be extinguished, the prompt will be extinguished at block 828, and the process repeats.

Figure 9:
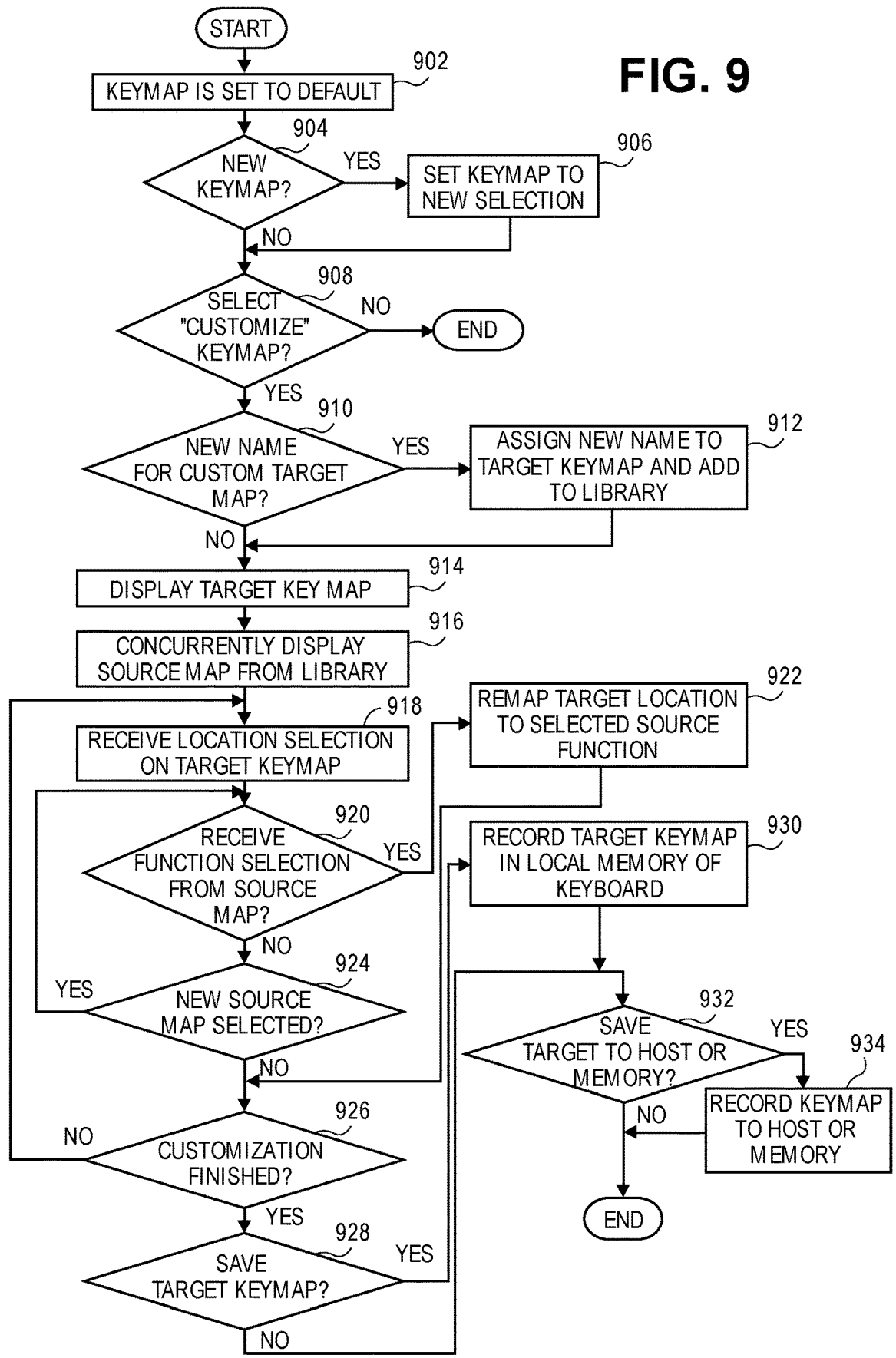
FIG. 9 is a flow diagram of customizing a key layout according to one embodiment of the invention.

FIG. 9 is a flow diagram of customizing a key layout according to one embodiment of the invention. At block 902, the key map (that is, what the keyboard will interpret a key press at a particular location on the key as signifying) is set to a default. The different key layouts including qwerty, azerty, colemak, dvorak and language-specific mappings all exist. In some embodiments, a user may select a key map from a library and declare it their default key map. However, in some embodiments, the keyboard comes out of the box with a predefined default key map, such as qwerty. The keyboards onboard memory can retain a plurality of keymaps. This allows the keymaps to be transportable between devices and usable even in the absence of Internet connectivity. A library of keymaps is available over the Internet and any map can be downloaded for retention locally in a host or within the keyboard itself. Notably, the key map, default or otherwise, need not be consistent with indicia printed on physical keys, and even blank key caps are possible (and quite practical where multiple key layouts are used with a single physical instrument).

At decision block 904, a determination is made if a new key map has been selected. If a new key map has been selected, the key map is set to the new selection at block 906. If no new key map has been selected, a determination is made at decision block 908 whether the user has selected to customize a keymap. If a request to customize a keymap is not received, the routine ends. If the user has selected to customize a keymap, at decision block 910 a determination is made whether a new name has been provided for the target keymap. If a new name has been provided, the new name is assigned to the target keymap, and the newly-named keymap is added to the library at block 912. This prevents overwriting of a master keymap. For example, a user's qwerty map can be modified and renamed without overwriting the master qwerty map residing in the library. The target keymap is then displayed on the display at block 914.

At block 916, a source map from the map library is concurrently displayed on the screen. Source map may be a keymap or a simple function menu/list. Any structure that allows a function to be identified so it can be associated with a target location could be used. For example, even a long macro script containing many characters could be associated with the actuation of a target location. At block 918, the system receives a location selection on the target keymap. Then a determination is made at decision block 920 whether a function selection from the source map has been received. If a function selection has been received from the source map, that function is remapped to the target location selected. If no source function selection is received from the source map, a determination is made at block 924 whether a new source map has been selected. Then this process repeats until a source function is received. This permits a single map to have functions selected from multiple different source maps. Thus, foreign characters, emoji, etc may be mixed in a single layout as desired by a particular user. After the remapping occurs at block 922 or no new source is selected at 924, a determination is made at block 926 whether the customization is complete. If the customization is not finished, the routine returns to receive additional target locations and repeats. Otherwise, a determination is made at block 928 whether to save the target keymap. If the target keymap is to be saved, the target keymap is recorded in the local memory of the keyboard. If the target keymap is not indicated to be saved locally, a determination is made whether the key map should be saved on the host at block 932. If the keymap should be saved at the host or other external memory, including on a cloud server, it is saved at the host at block 934. If it is not to be saved locally or externally, the routine ends and the partially customized map is discarded.

Figure 10:
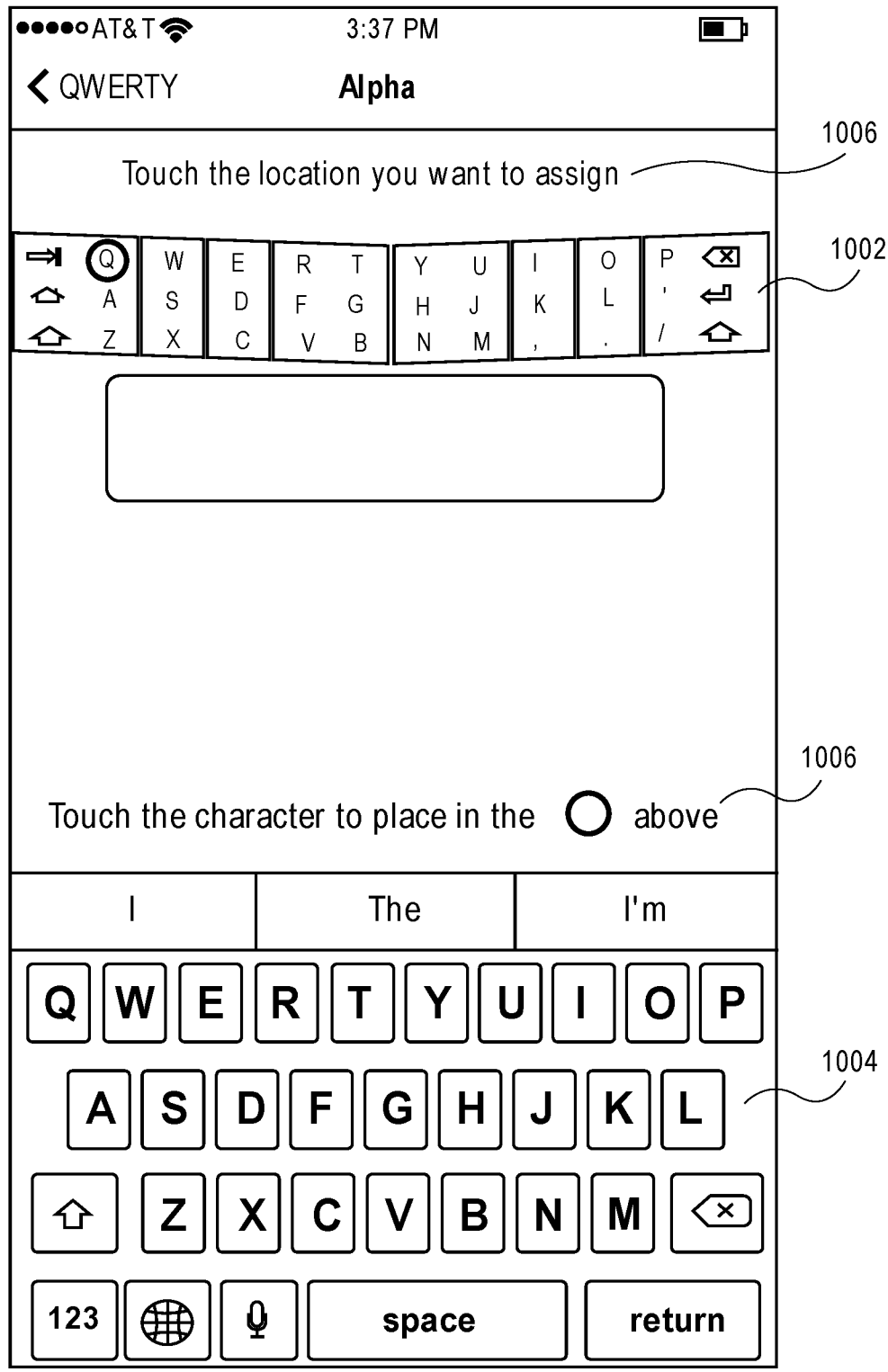
FIG. 10 shows a graphical user interface for keymap customization according to one embodiment of the invention.

FIG. 10 shows a graphical user interface for keymap customization according to one embodiment of the invention. Screen 122 of a host device shows a target layout 1002 and the source keyboard 1004. Additional screen real estate can be used to provide written instructions 1006 to facilitate the user's use of the customization tool. In this embodiment, the circle at the location Q on the target key map 1002 represents a selected location. Selecting any key on the source map 1004 remaps the selected key to the Q location. For example, if a user presses G on source map 1004, the Q location in the target map is changed to be mapped to G. Without more customization, there would be G at both the Q location and the normal G location in the target map. Further customization can be performed to move any set of functions to any place on the keyboard. By touching any location in the target map, that location becomes the focus location to which the next source selection will be mapped.

Moreover, as described above in connection with FIG. 9, the user is free to shift the source map to another key map or even simply a list of functions that can be selected and then mapped to locations on the target 1002. By way of example, emoji or even macros can be mapped to any key location on the target.

Figure 11:
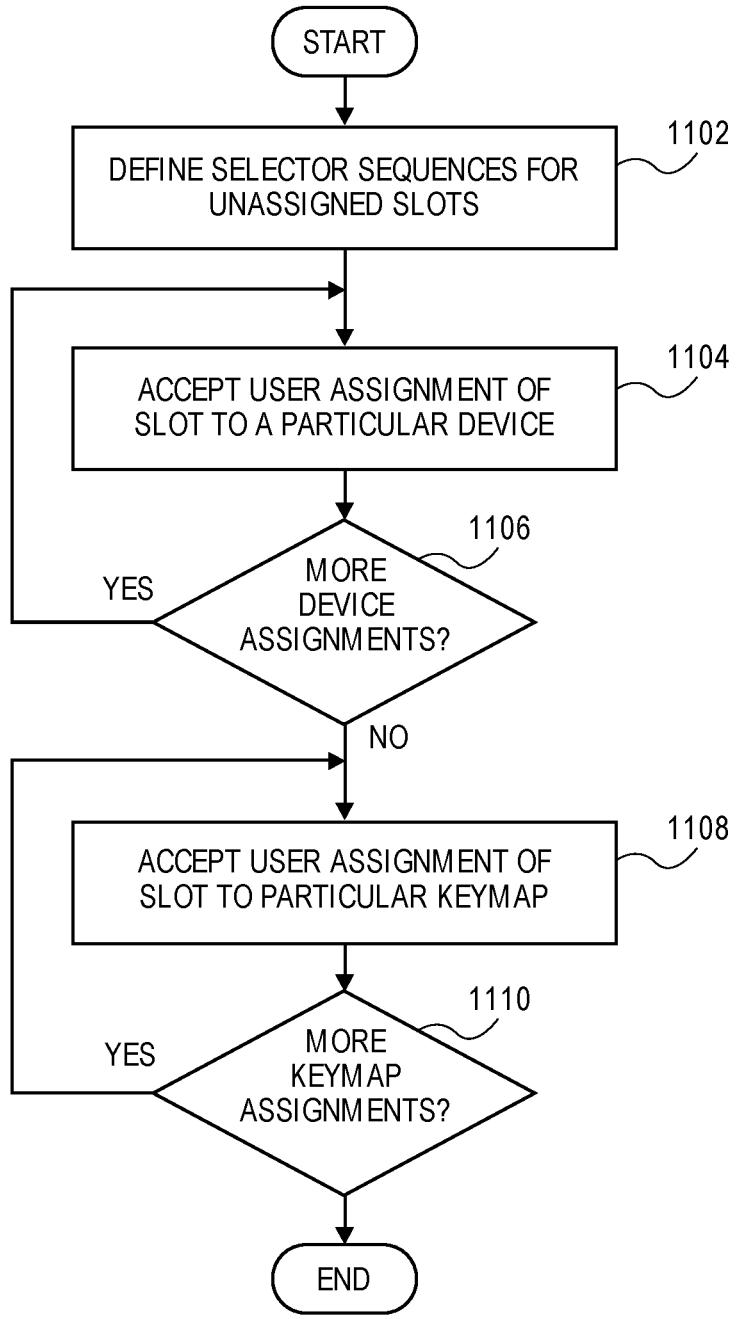
FIG. 11 is a flow diagram of a process of assigning hosts and key maps to facilitate access according to one embodiment of the invention.

FIG. 11 is a flow diagram of a process of assigning hosts and key maps to facilitate access according to one embodiment of the invention. In one embodiment, there are a number of slots that are defined to be associated with either distinct devices or different key maps. The access for selection of slots is defined at block 1102. In one embodiment, six distinct slots are associated with top row chords on the keyboard. For example, chords of the QW location, the WE location, the ER location and the RT location could represent one set of three slots, and UI, IO and OP might represent an additional three slots. These sequences allow immediate switching to a desired key map or device without opening a menu or scrolling through options. The system is particularly useful for multilingual users who switch between different key maps, or users who wish to use and switch quickly between multiple devices.

At block 1104, a user may select a particular sequence and assign a particular device to that slot. At block 1106, a determination is made if there are more devices for which a user desires to assign slots. It is expected that the number of devices will typically be between 1 and 4. However, in the example embodiment, 6 devices can be accommodated. If there are no more devices to be assigned, the routine accepts an assignment of a key map to a particular slot. A determination is then made at block 1110 whether there are more key maps to be assigned. If so, additional key maps are assigned to additional slot. If not, the routine ends. At the end of the routine, the user has populated the slots with a desired number of devices and key maps as the ability to instantly change devices or key maps by actuating the sequence (e.g. chord) associated with the corresponding slot. Thus, for example, if a first device is assigned to the chord QW and a second device is assigned to the chord WE, the user can instantly transition from the first device to the second device by simply striking the chord WE. Similarly, if qwerty is assigned to the slot UI and colemak is assigned to the slot 10, the user can toggle between those key maps on the respective host simply by hitting the corresponding chord.

Figure 12:
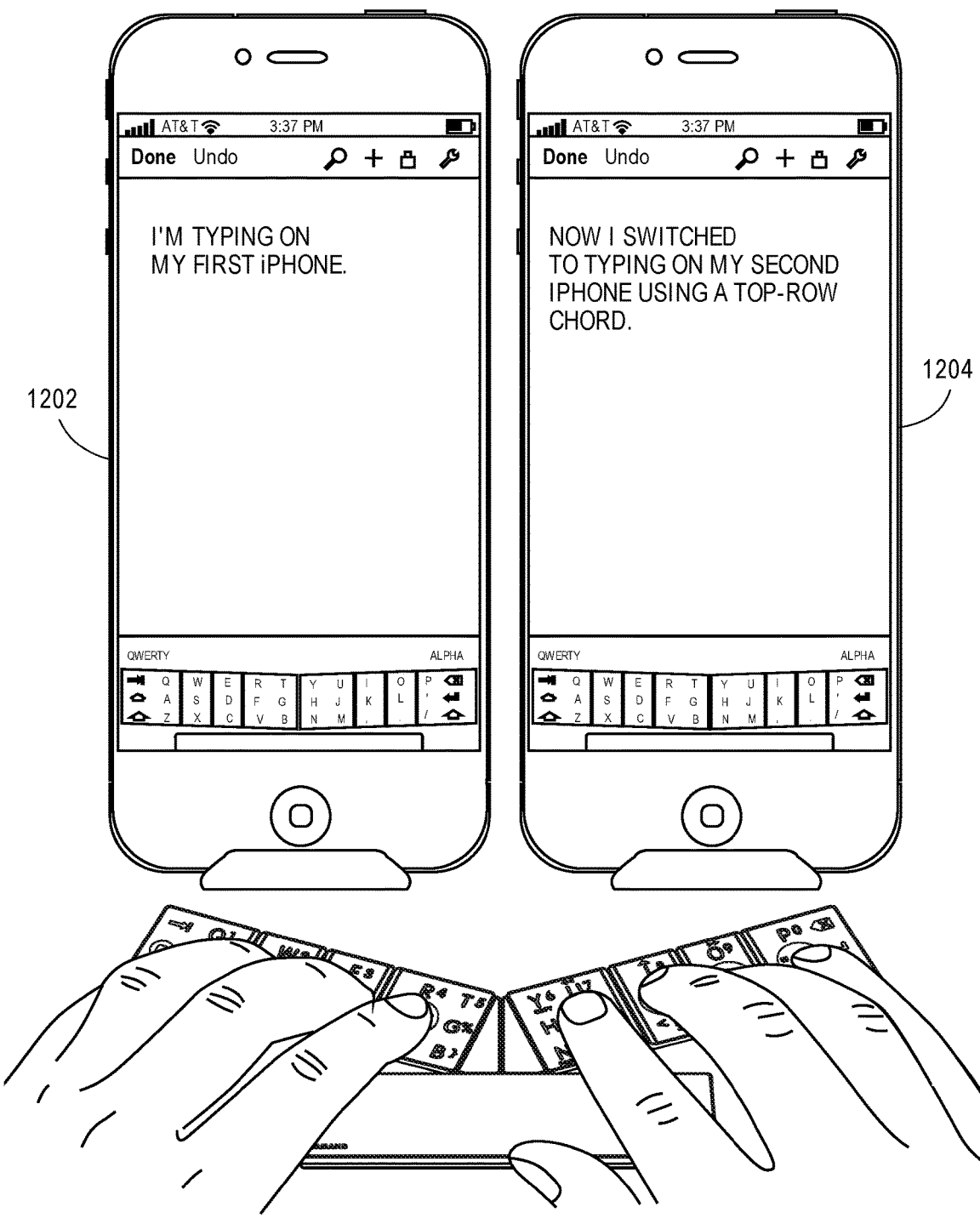
FIG. 12 shows a diagram of a multi-host system according to one embodiment of the invention.

FIG. 12 shows a diagram of a multi-host system according to one embodiment of the invention. As described with reference to FIG. 11, a user need only press the corresponding chord to toggle between first host 1202 and second host 1204. There is no requirement of repairing and no requirement to use a drop-down menu or the like to switch back and forth.

Figure 13:
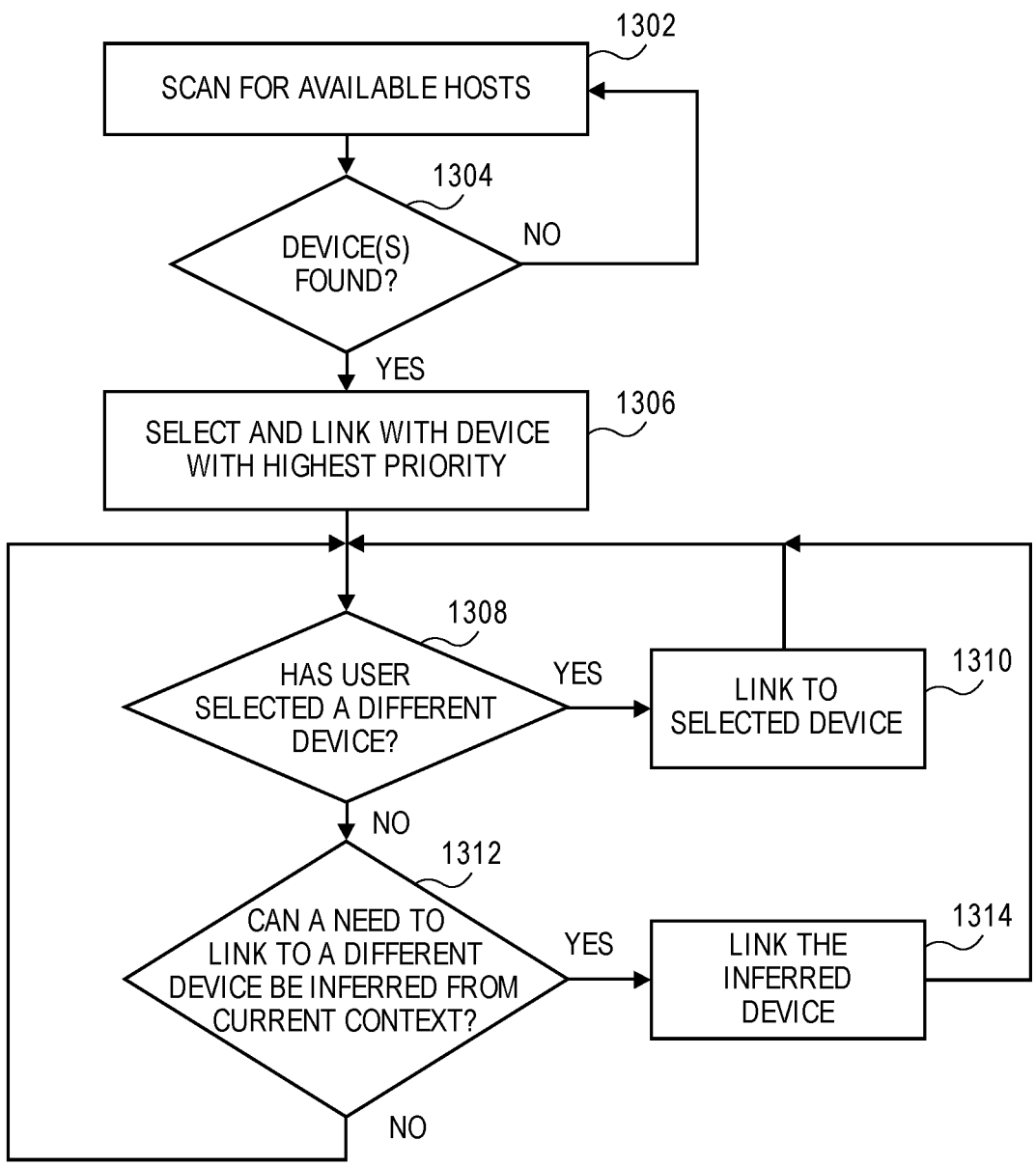
FIG. 13 is a flow diagram of device selection in one embodiment of the invention.

FIG. 13 is a flow diagram of device selection in one embodiment of the invention. When the keyboard is powered up, it scans for available hosts at block 1302. At block 1304, if no devices are found it continues to scan until a device is found. If one or more devices are found, it selects and links to the device having the highest priority at block 1306. In one embodiment, priority is determined by the slot location of a particular device. Thus, a device assigned to the first slot is given highest priority, the second slot is given second priority, and so forth. At block 1308, a determination is made that a user has selected a different device. As discussed above, the selection of a different device can result from determination that a user actuated the chord associated with the slot to which the device is assigned. If a user has selected a different device, the keyboard links to the selected device at block 1310. The user has not selected a different device, a determination is made at block 1312 whether the need to link to a different device can be inferred from context. If it is possible to infer that a link to a different device is desirable, the keyboard links to the inferred device at block 1314. The routine continues, allowing user to freely switch back and forth between devices.

Figure 14A:
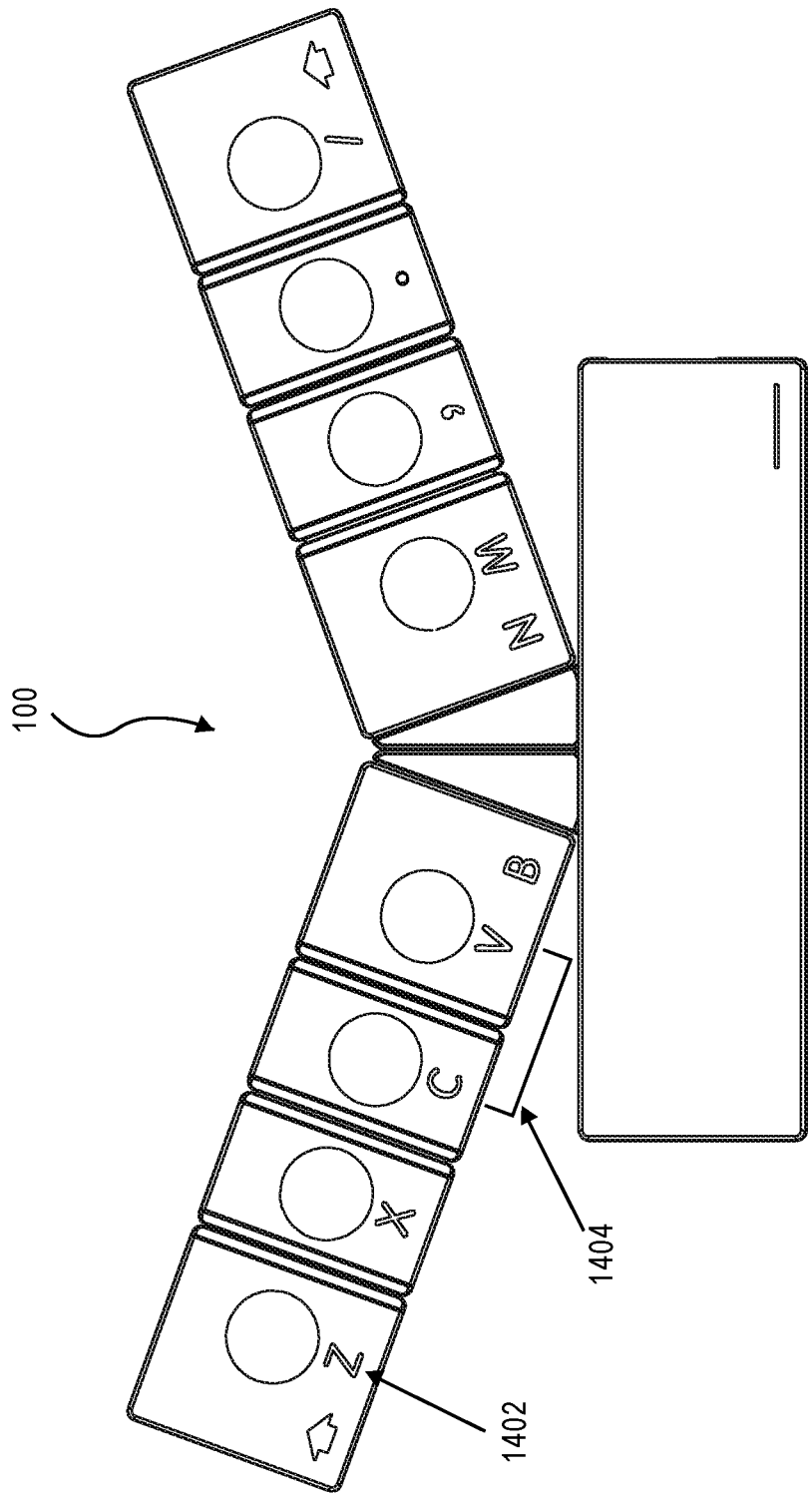
FIGS. 14A-14C are diagrams explaining the chording mnemonic believed to be effective for use in connection with one embodiment of the invention.
Figure 14B:
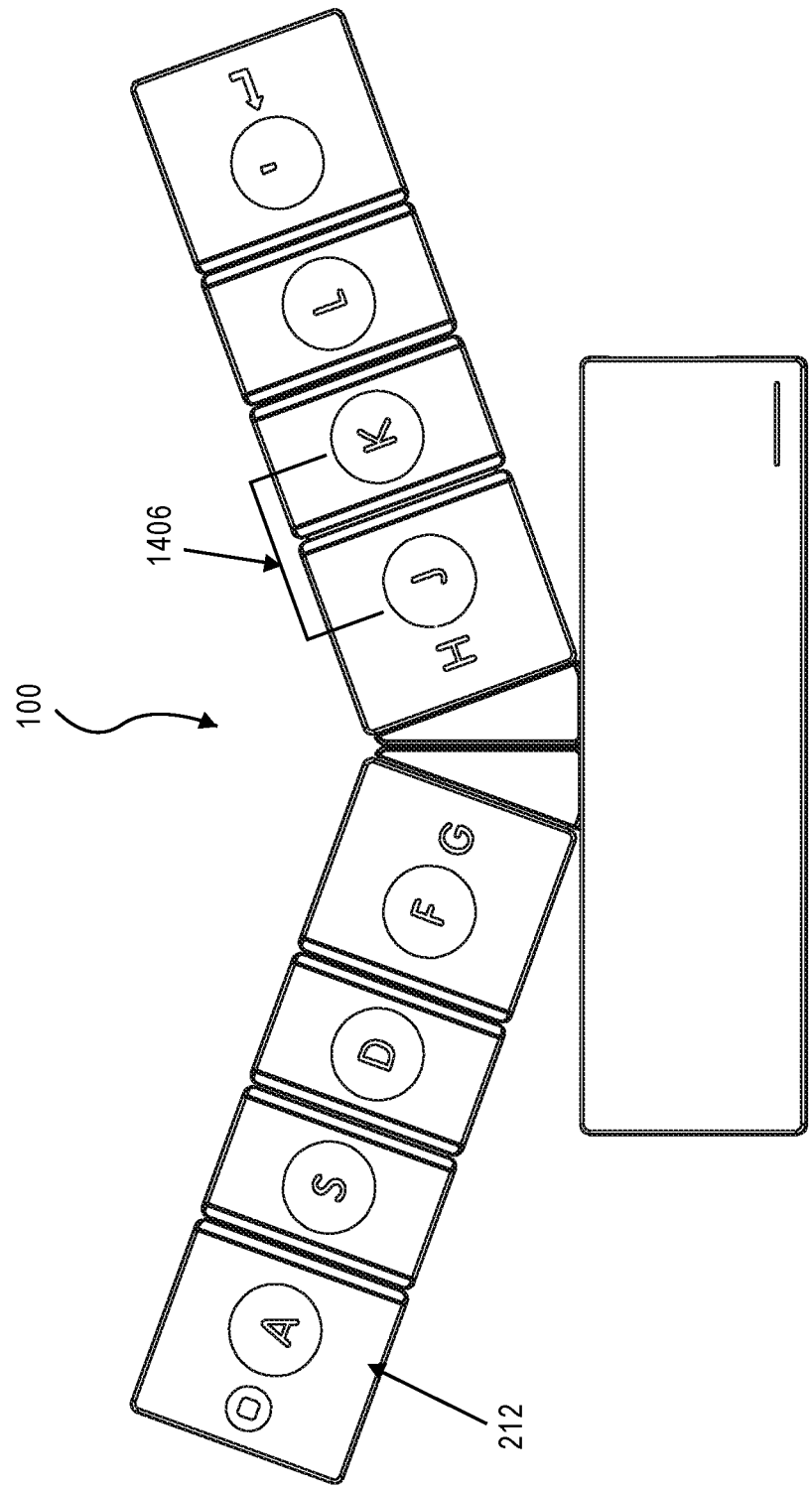
Figure 14C:
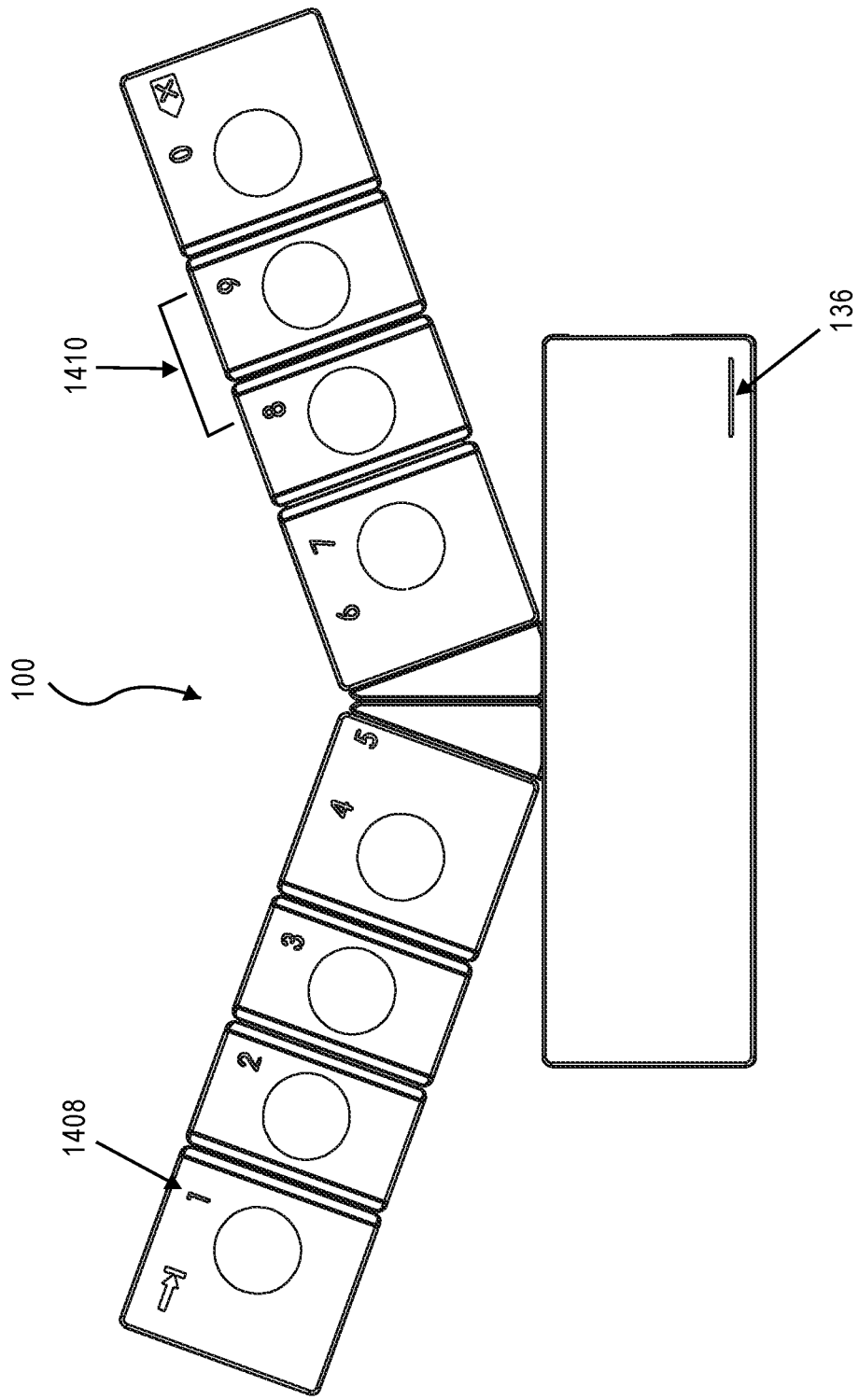

FIGS. 14A-14C are diagrams explaining the chording mnemonic believed to be effective for use in connection with one embodiment of the invention. FIG. 14A shows the bottom row characters 1402. Bottom row characters can be chorded to achieve modifiers. For example, chord CB 1404 is equivalent to a command function. Thus, the bottom row can be used for option, alt, command, esc, etc. FIG. 14B provide cording for home row cursor and edit function. In one embodiment of the invention, middle row chords are used for edit functions such as cut-and-paste, cursor, etc., as well as function keys F1 through F12, and so forth. Finally, the chords on the top row are used for screen selection or language selection. Chord 1460 gives direct access to one of a series of slots that are user-definable. Mnemonically, lower level function are chorded on the bottom row and increasingly higher level functions are chorded on higher rows.

Figure 15A:
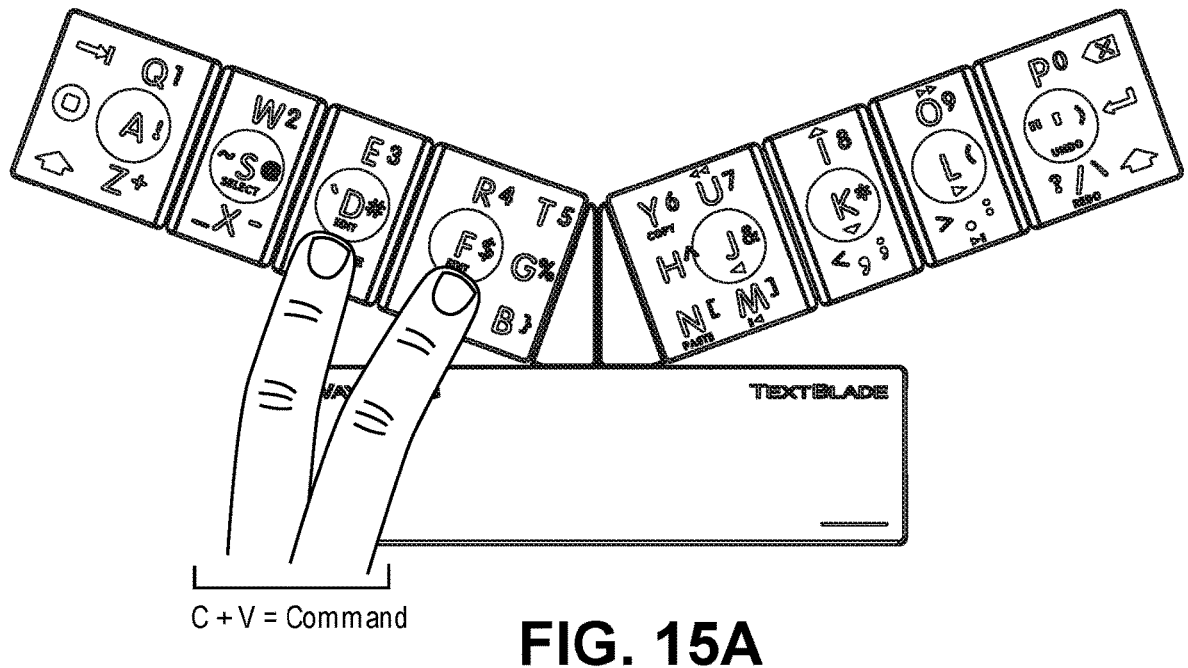
FIGS. 15A-15B show the manner in which the ctrl function can be activated with either the right hand or the left hand.
Figure 15B:
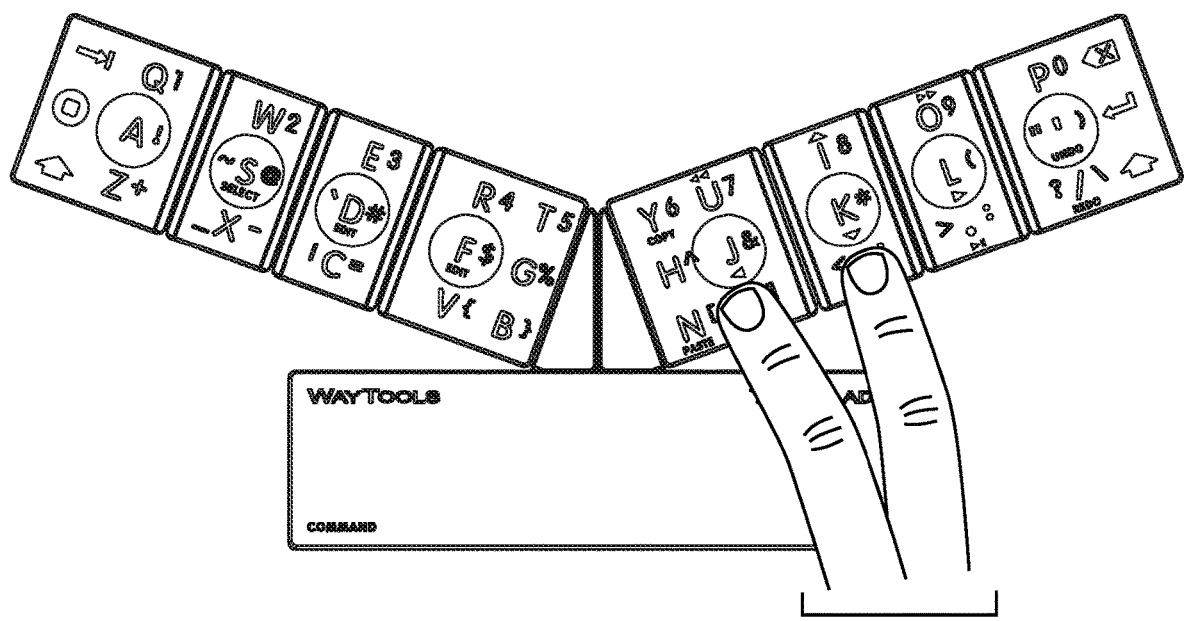

FIGS. 15A-15B show the manner in which the ctrl function can be activated with either the right hand or the left hand. As shown in FIG. 14A, the left hand can achieve the command function by chording c and v, that is, actuating the c and v locations on the keyboard simultaneously. Similarly, as shown in FIG. 15B, concurrently actuating the m location and the comma location allows activation of the command function with the right hand.

Figure 16A:
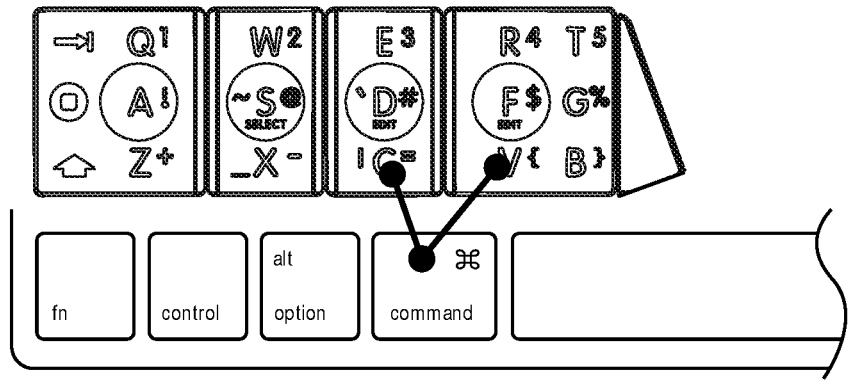
FIGS. 16A-16C show the mappings of the left hand sequence for the ctrl, alt and command functions.
Figure 16B:
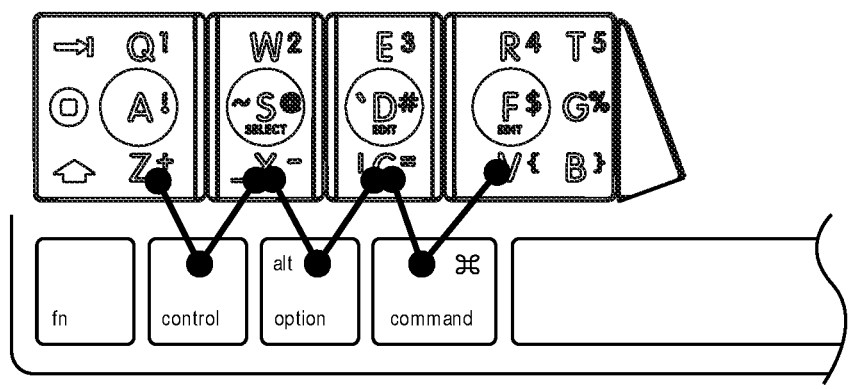
Figure 16C:
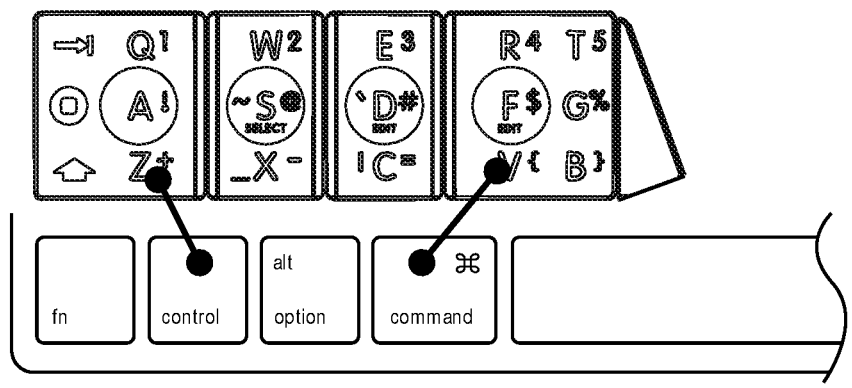

FIGS. 16A-16C show the mappings of the left hand sequence for the ctrl, alt and command functions. FIG. 16A reveals that concurrently actuating the c and v locations with the left hand results in a command function. FIG. 16B shows that concurrently actuating v, c, x and z locations achieves the chording of control+alt+command, thus giving all three functions currently. Also revealed in FIG. 16B is that alt alone is actuated by x and c together, and ctrl alone is actuated by z and x together. A mirror relation exists for these functions when actuated with the right hand.

Figure 17:
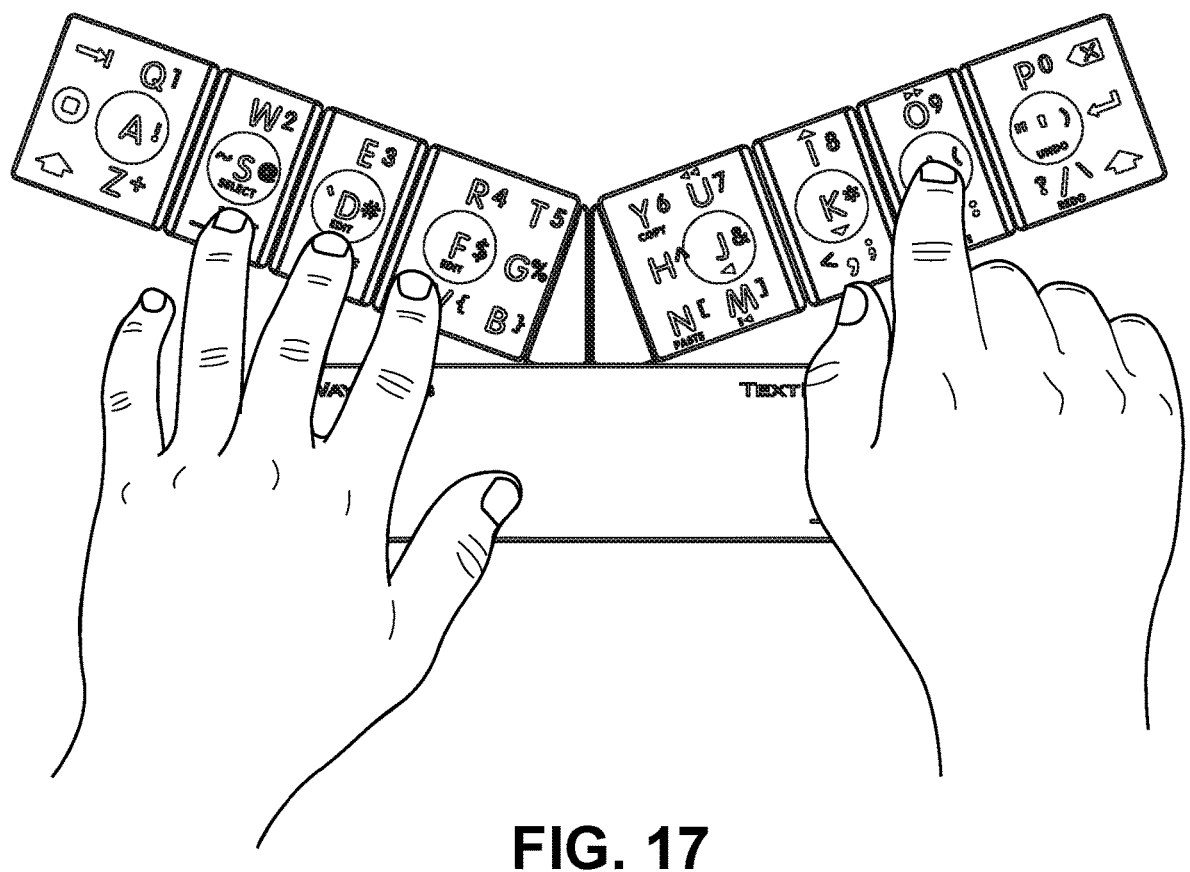
FIG. 17 shows the finger chording for command+alt+L.

FIG. 17 shows the finger chording for command+alt+L. In this instance, the v location, the c location and x location are concurrently actuated along with the L location. It should be noted that the chording locations associated with each of the functions command, alt and ctrl are located near where those locations would be found on a historical keyboard. Moreover, each of these functions can be actuated with either hand. Thus, command+alt+D uses a right hand chord for the command+alt portion, and D can be actuated with the left hand.

Figure 18:
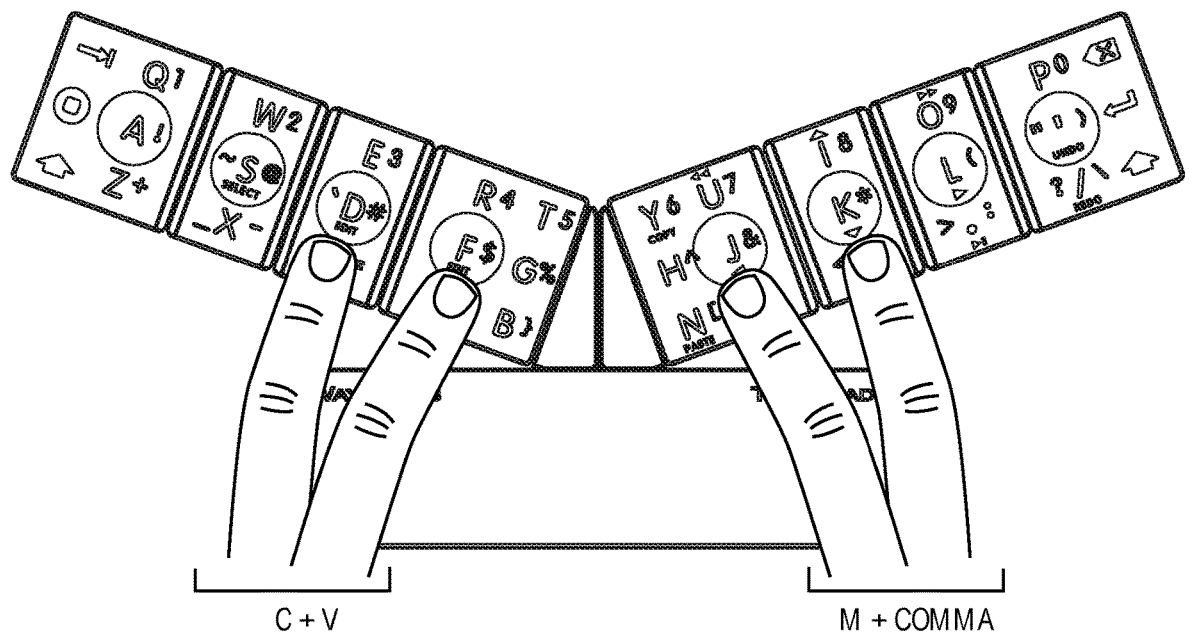
FIG. 18 shows a diagram of dual-handed chording.

FIG. 18 shows a diagram of dual-handed chording, which may be used in one embodiment of the invention to access additional layers that may be user-definable beyond the three standard defined layers, alpha, green and edit. For example, a user may create a macro layer, and moving to the macro layer is achieved by dual chording C and V and M and comma to reach the fourth layer. In this manner, an arbitrarily large number of layers can be user-defined as part of a single key map and be readily accessible to a user.

An important phenomenon with touch typing is that human fingers often lay over multiple key locations when striking another location. For example, when pressing the "Return" key, the pinky finger may drape over the surface of the "Shift" key. On a conventional keyboard, this has no effect because each key is an independent plastic mechanism. Unless the nearby key were pressed to the point of actuation, there would be no contention of characters.

In the case of the multi-touch keys described herein, several characters are provided on a single plastic keytop. When fingers are draped across two or more multitouch sensing zones, it is possible to have contention. If "Return" and "Shift" for example, are on the same plastic key, and it is pressed with both zones covered by the flesh of the same finger, it could be unclear which character is selected.

It is therefore desirable to have a means to infer from the available input data which character was intended. In one embodiment, a software algorithm recognizes a pattern of two or more characters selected on the same key. In one embodiment, the algorithm identifies this pattern by comparing the signal strength of each of the capacitive sensor pads located on that same physical key. The strongest pad signal is compared with the second strongest pad signal. If the difference is below a threshold, a determination is made that two pads were concurrently operated. The two pads are then compared with a table of possible combinations to determine if a defined pattern was input. If the pattern matches an entry in the table, then the algorithm outputs the character mapped to that pattern. In the example above, the pattern of a "Return" key and a "Shift" key would map to a "Return" key. In one embodiment, the algorithm would interpret two pads in a single vertical column to be the upper character. Because of the way humans lay their fingers on keys, it is often the case that when selecting a character, the character immediately below it may also be covered by the finger without intending to select it. These patterns may be expanded to include a capacitive signature of amplitude and location on more than 2 pads. In a multitouch key with 6 pads for example, the pattern may include signatures for various relative amplitudes at all 6 locations during a keypress event. The rules for the table entries can be completely independent and different at each unique location on the keyboard, and define diverse individual relationships relative to each respective neighboring pad.

In some embodiments, a pattern recognition algorithm can be given executive authority over which character is produced, and such algorithm can override the results of a simple direct quantitative comparison of signal on competing pads. In this way, a pad with weaker signal may prevail over one with a stronger signal because of the logical inferences that can be made from the pattern of amplitudes on the different pads. So for example, if "Return" and "Shift" both have strong signals, the algorithm could have "Return" prevail with a signal of 82 even though "Shift" may have a signal of 95, because this two pad combination has a rule in a table, that gives "Return" priority when both are present.

Mechanical keyboards generally have fixed spatial distribution of character actuation locations corresponding to the location of plastic keys. Because this multitouch keyboard is defined primarily by software maps and algorithms, it is possible to alter the spatial distribution of actuation locations for a given character. Since the physical size and shape of fingers, and the typing style of different human operators may vary widely, it is desirable to allow users to individually customize the spatial boundaries of actuation locations for different characters to suit their personal needs. Using a graphical control on a configuration application program, a user may move the actuation boundary closer or farther from the nominal dividing line between actuation locations on the surface of the key. For example, if a user wishes to create a wider acceptance zone for the "Return" function, they could move a slide control on a configuration application program farther north to invade the zone of the "Backspace" key. This would result in a larger aperture for strikes that produce a "Return" input.

The legends of conventional mechanical keyboards reside on the physical keytops. These legends are not visible when fingers cover the keytop, necessitating removal of the finger to see the legend. Such legends are also not visible in the dark unless illuminated by backlighting, at considerable power consumption. It is desirable to have access to all legends without these constraints.

An on-screen legend array avoids these deficits and allows a user to stay focused on the screen where they are creating their content, instead of looking down at the physical keys. One drawback of such on-screen legends is that they consume screen real estate. Because of the unique relationship possible with a compact, one-key-per-finger keyboard, a dramatic reduction in screen area used for the legend array can be achieved. Since the fingers can press on the real physical keys, the on-screen legends need only be large enough for visual recognition. Such compact on-screen can also be dynamic with changing functions, and can maximize the remaining screen area for content. This is particularly useful with smaller screens common on smartphones. On-screen key legends that occupy 20% of the screen or less are particularly desirable because they leave at least 80% of the screen available for content. As disclosed in the attached captures from phones and tablet screens, the present invention uses an efficient graphical layout to result in a minimal number of vertical pixels, thereby minimizing the use of screen real estate, and meeting the 20% goal.

The invention uses chords of various key combinations to overlay other functions on the alphabetic character locations. In one embodiment, the function keys F1 through F10 are overlaid with letters Q through P, which also provide shift access to numbers 1 through 0. In this embodiment, keys K and L form a chord to select function key mode. Holding down K and L would result in a conflict with attempting to select 8 or 9 concurrently. To resolve the conflict, it is desirable to have a latched state that can persist after the K and L keys are released. Once latched, any key, including those used to enter the latched state, may be used to select a function key such as F8 or F9. In cases where no conflict exists, it may be more convenient to simply hold down K and L while say, the 3 or 4 key is pressed concurrently to select F3 or F4. To reconcile these different needs, an intelligent scheme is provided in the invention. In one embodiment, when the K and L key are concurrently tapped for less than 300 milliseconds, the keyboard will enter the latched state for selecting a function key. If the next key hit is one of numbers 1 through 0, a function F1 through F10 will be produced, and the function key mode will extinguish. If K and L are held for longer than 300 milliseconds, the function key mode will persist for as long as K and L are held down. Any number key pressed during that time will result in the corresponding function key. As soon as K and L are released, the state will unlatch and the function key mode will extinguish. In this way, the invention provides access to every function key, while providing the convenience of automatic exit of the function key mode without requiring a separate action.

Another feature of interest in the invention is the ability to summon the on-screen legends or hide them at will. In one embodiment, this is achieved by a unique chord of at least two fingers. In another embodiment, the chord is 4 fingers concurrently down on home row to bring up, or extinguish the on-screen key legend array. In other embodiments, other key chords may be used to perform the same function.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A system comprising:
a first host processor in communication with a display;
a keyboard with a plurality of independently moveable physical keys;
wherein each letter of an entire alphabet is accessible by a single strike actuation of one of the plurality of keys,
wherein twelve or fewer keys provide single strike access to the entire alphabet;
a map defining functions of the keys that appears on the display responsive to a prompting action of a users hand without requiring any finger to leave the keys that provide access to the alphabet, wherein the prompting action is distinct from content typing; and
wherein the map defines the spatial relationship of each function relative to a home position of a finger.

2. The system of claim 1 wherein the map appears responsive to an action of a thumb on a spacebar.

3. The system of claim 2 wherein the prompting action is at least one of a lateral swipe, a press and hold exceeding a threshold of time, a vertical swipe, at least one tap on the spacebar surface without actuating the space character function, and a press on a corner of the spacebar.

4. The system of claim 1 wherein the map appears responsive to a prompting action of at least one finger on at least one key wherein the action is at least one of a lateral swipe, a vertical swipe, at least one tap on the key surface without actuating a character function, and concurrent actuation of two or more predefined keys.

5. The system of claim 1 wherein the map disappears automatically responsive to an actuation of a next key immediately after the map appears.

6. The system of claim 1 wherein the map correlates to an arrangement of the physical keys on the keyboard, and wherein the map visually defines which functions are associated with each finger.

7. The system of claim 1 wherein the keyboard provides access to a plurality of layers of functions assigned to the same plurality of physical keys, each layer represented by a different visual map.

8. The system of claim 7 wherein a user navigates the plurality of layers by a navigation action of a hand on the keyboard, and wherein responsive to the prompting action the map displayed corresponds to a presently active layer, and a strike on a physical key location returns the corresponding function marked on the map.

9. The system of claim 8 wherein at least some of the layers correspond to different languages.

10. The system of claim 8 wherein at least some of the layers correspond to different character layouts.

11. A system comprising:
a first host processor in communication with a display;
a second host processor wherein a user switches amongst the plurality of host processors by an action of a hand on the keyboard;
a keyboard with a plurality of independently moveable physical keys;
wherein each letter of an entire alphabet is accessible by a single strike actuation of one of the plurality of keys;
wherein twelve of fewer keys provide single strike access to the entire alphabet;
a map defining functions of the keys that appears on the display responsive to a prompting action of a user's hand without requiring any finger to leave the keys that provide access to the alphabet, and
wherein the map defines the spatial relationship of each function relative to a home position of a finger.

12. The system of claim 1 wherein the action is a chord comprising two or more keys pressed concurrently.

13. The system of claim 12 wherein the prompting action is the chord pressed for a defined amount of time.

14. The system of claim 7 wherein the visual map of the current layer shows those functions accessible via a single strike of one finger, and wherein there is one key for each finger, and wherein the map shows locations on the surface of each key that select each function.

15. A system comprising:
a host processor in communication with a display;
a keyboard with a plurality of independently moveable physical keys;
wherein eight keys provide single strike access to an entire alphabet, each key having a home location for one of a user's eight fingers; and
a map that appears on the display, the map depicting a function currently available at each location on a surface of a respective key relative to the home location
wherein the map appears on the display responsive to a prompting action of a user's hand without requiring any finger to leave the keys that provide access to the alphabet, wherein the prompting action is distinct from continent typing.

16. The system of claim 15, wherein the function at each location is selected by detecting a finger with a multi-touch sensor.

17. The system of claim 15 wherein the keyboard provides access to a plurality of layers of functions assigned to the same plurality of physical keys.

18. The system of claim 15 wherein an algorithm interprets a pattern of signal strength on at least two sensor pads to infer an intended character, even when the intended character may have a weaker signal at its pad location.

19. The system of claim 15 wherein a spatial boundary between character locations can be changed via a software mapping.

20. The system of claim 15 wherein a software mapping of key locations to output characters may be defined on an application program that allows a user to alter the mapping via a graphical user interface.

* * * * *